US010522986B2

(12) United States Patent
Chuang et al.

(10) Patent No.: US 10,522,986 B2
(45) Date of Patent: *Dec. 31, 2019

(54) HOLDOUT SUPPORTS AND PRE-EXPANDED UNITS AND METHODS INCLUDING SAME

(71) Applicant: TE Connectivity Corporation, Berwyn, PA (US)

(72) Inventors: Kok Chywn Chuang, Raleigh, NC (US); Edward O'Sullivan, Cary, NC (US); Mahmoud K. Seraj, Apex, NC (US)

(73) Assignee: TE Connectivity Corporation, Berwyn, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/227,179

(22) Filed: Dec. 20, 2018

(65) Prior Publication Data

US 2019/0123528 A1 Apr. 25, 2019

Related U.S. Application Data

(63) Continuation of application No. 15/720,694, filed on Sep. 29, 2017, now Pat. No. 10,199,809.

(Continued)

(51) Int. Cl.
*H02G 1/14* (2006.01)
*H02G 15/18* (2006.01)
(Continued)

(52) U.S. Cl.
CPC ............... *H02G 1/14* (2013.01); *H01B 17/58* (2013.01); *H02G 3/0418* (2013.01); *H02G 15/1833* (2013.01)

(58) Field of Classification Search
CPC .... H02G 1/14; H02G 3/0418; H02G 15/1833; H01B 17/58

(Continued)

(56) References Cited

U.S. PATENT DOCUMENTS 3,163,707 A 12/1964 Darling
3,475,719 A 10/1969 Akin et al.
(Continued)

FOREIGN PATENT DOCUMENTS

WO 2009/137013 11/2009
WO WO-2009137013 A1 * 11/2009 ............... H01R 4/70

OTHER PUBLICATIONS

"CSJA Cold Shrinkable 'All-In-One' Straight Joint for Polymeric Insulated Cables Up to 42 kV" Tyco Electronics EPP 1348 (4 pages) (Jul. 2007).

(Continued)

*Primary Examiner* — Timothy J Thompson
*Assistant Examiner* — Charles Pizzuto
(74) *Attorney, Agent, or Firm* — Myers Bigel, P.A.

(57) ABSTRACT

An integral, unitary pre-expanded cover assembly unit for covering an electrical connection between first and second electrical cables each having a primary conductor and a neutral conductor includes a cover assembly, a holdout and a holdout support. The cover assembly includes an elastomeric sleeve and a duct. The elastomeric sleeve defines a cable passage to receive the electrical connection and the primary conductors of the first and second cables. The duct overlies the elastomeric sleeve. The duct defines a duct passage configured to receive at least one of the neutral conductors therethrough. The holdout is removably mounted within the cable passage of the elastomeric sleeve. The holdout defines a holdout passage. The holdout maintains the elastomeric sleeve in an expanded state. The holdout support is removably mounted within the holdout passage. The holdout support reinforces the holdout.

20 Claims, 20 Drawing Sheets

Related U.S. Application Data

(60) Provisional application No. 62/460,435, filed on Feb. 17, 2017.

(51) Int. Cl.
   *H01B 17/58* (2006.01)
   *H02G 3/04* (2006.01)

(58) Field of Classification Search
   USPC .......................................................... 174/93
   See application file for complete search history.

(56) References Cited

U.S. PATENT DOCUMENTS

| | | |
|---|---|---|
| 3,689,114 A | 9/1972 | Meserole |
| 4,601,529 A | 7/1986 | Billet |
| 4,968,857 A | 11/1990 | McGrane |
| 5,233,363 A | 8/1993 | Yarsunas et al. |
| 5,286,220 A | 2/1994 | Watson |
| 5,315,063 A | 5/1994 | Auclair |
| 5,577,926 A | 11/1996 | Cox |
| 5,740,583 A | 4/1998 | Shimada et al. |
| 5,844,170 A | 12/1998 | Chor et al. |
| 6,364,677 B1 | 4/2002 | Nysveen et al. |
| 7,182,617 B1 | 2/2007 | Cairns et al. |
| 7,264,494 B2 | 9/2007 | Kennedy et al. |
| 7,476,114 B1* | 1/2009 | Contreras ................ H01R 4/70 439/201 |
| 7,728,227 B2 | 6/2010 | Portas et al. |
| 7,858,883 B2 | 12/2010 | Seraj et al. |
| 8,030,570 B2 | 10/2011 | Seraj et al. |
| 8,205,911 B2 | 6/2012 | Cordes et al. |
| 9,184,576 B2 | 11/2015 | Vallauri et al. |
| 9,202,612 B2 | 12/2015 | Hernandez et al. |
| 9,224,519 B2* | 12/2015 | McLaughlin ...... H02G 15/1826 |
| 9,224,522 B2 | 12/2015 | Yaworski et al. |
| 9,960,576 B2 | 5/2018 | Chuang |
| 2005/0269124 A1 | 12/2005 | Suzuki et al. |
| 2007/0293087 A1 | 12/2007 | Kennedy et al. |
| 2008/0143097 A1 | 6/2008 | Canale |
| 2009/0181583 A1 | 7/2009 | Krabs et al. |
| 2010/0012350 A1* | 1/2010 | Hardi ................ H02G 15/1826 174/135 |
| 2010/0279542 A1 | 11/2010 | Seraj et al. |
| 2017/0310093 A1 | 10/2017 | Chuang |
| 2017/0317481 A1 | 11/2017 | O'Sullivan et al. |

OTHER PUBLICATIONS

"CSJA In-line Cold Shrinkable Joints for 1/C Shielded Power Cables (15-35kV)" Tyco Electronics (2 pages) (2006/2007).

* cited by examiner

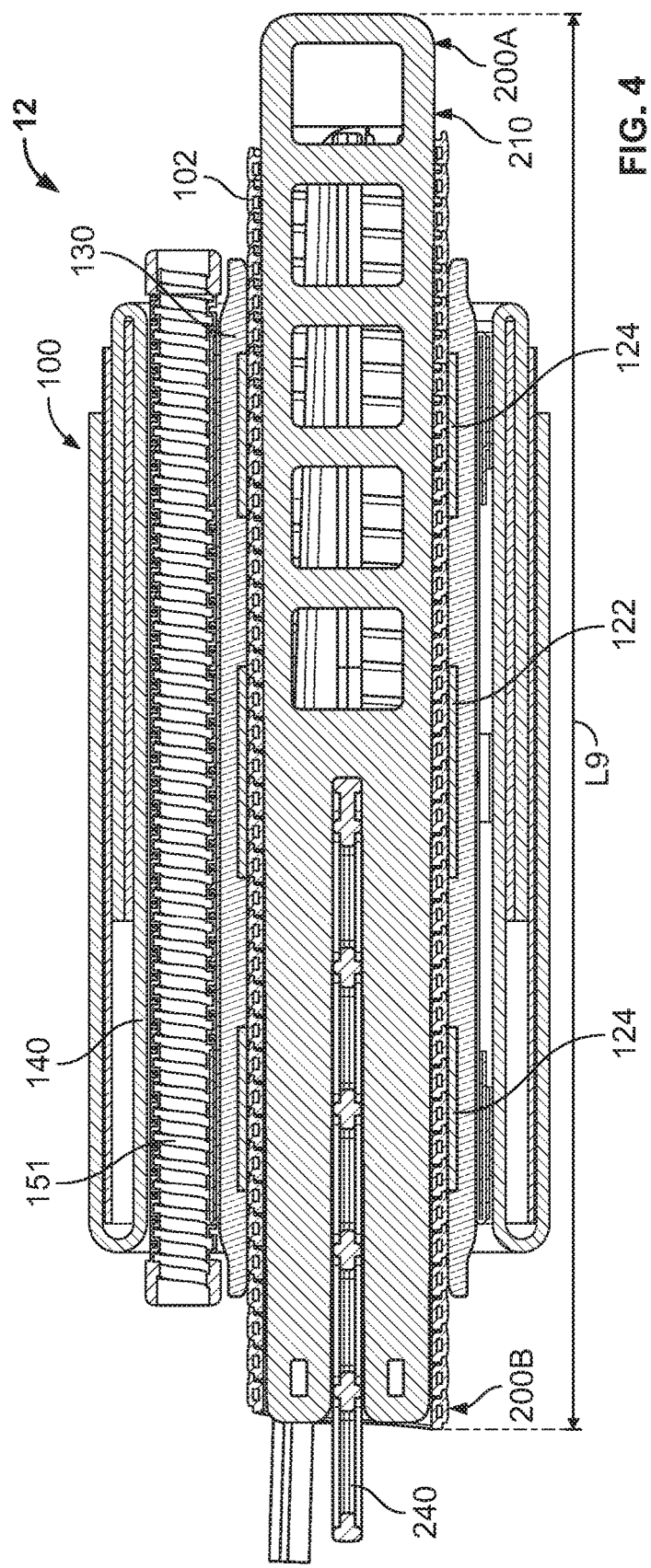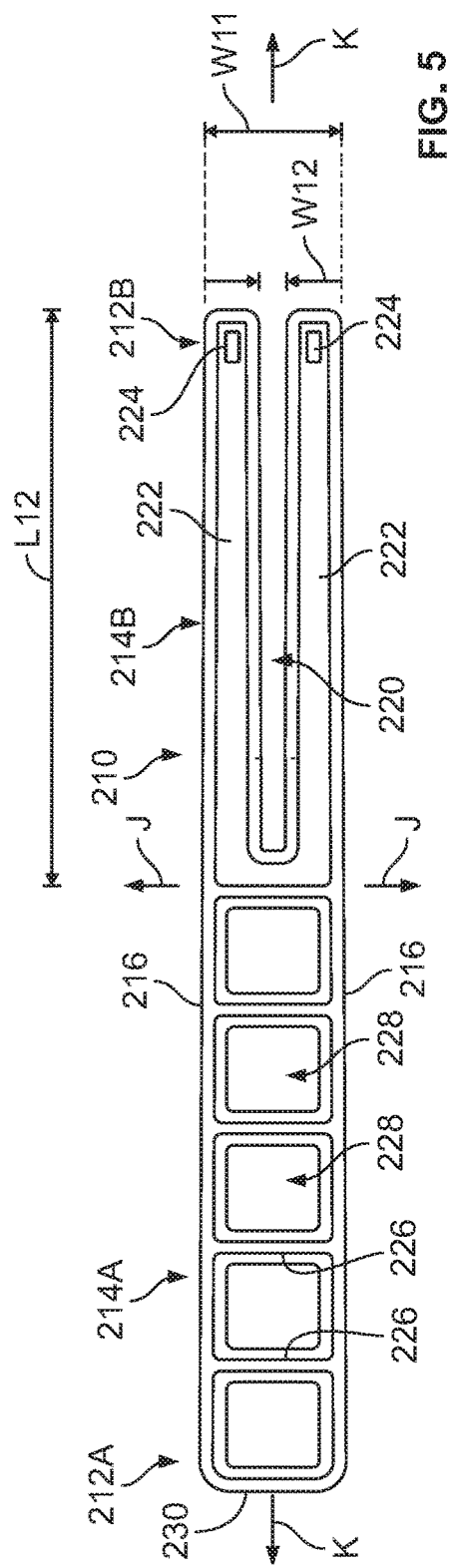

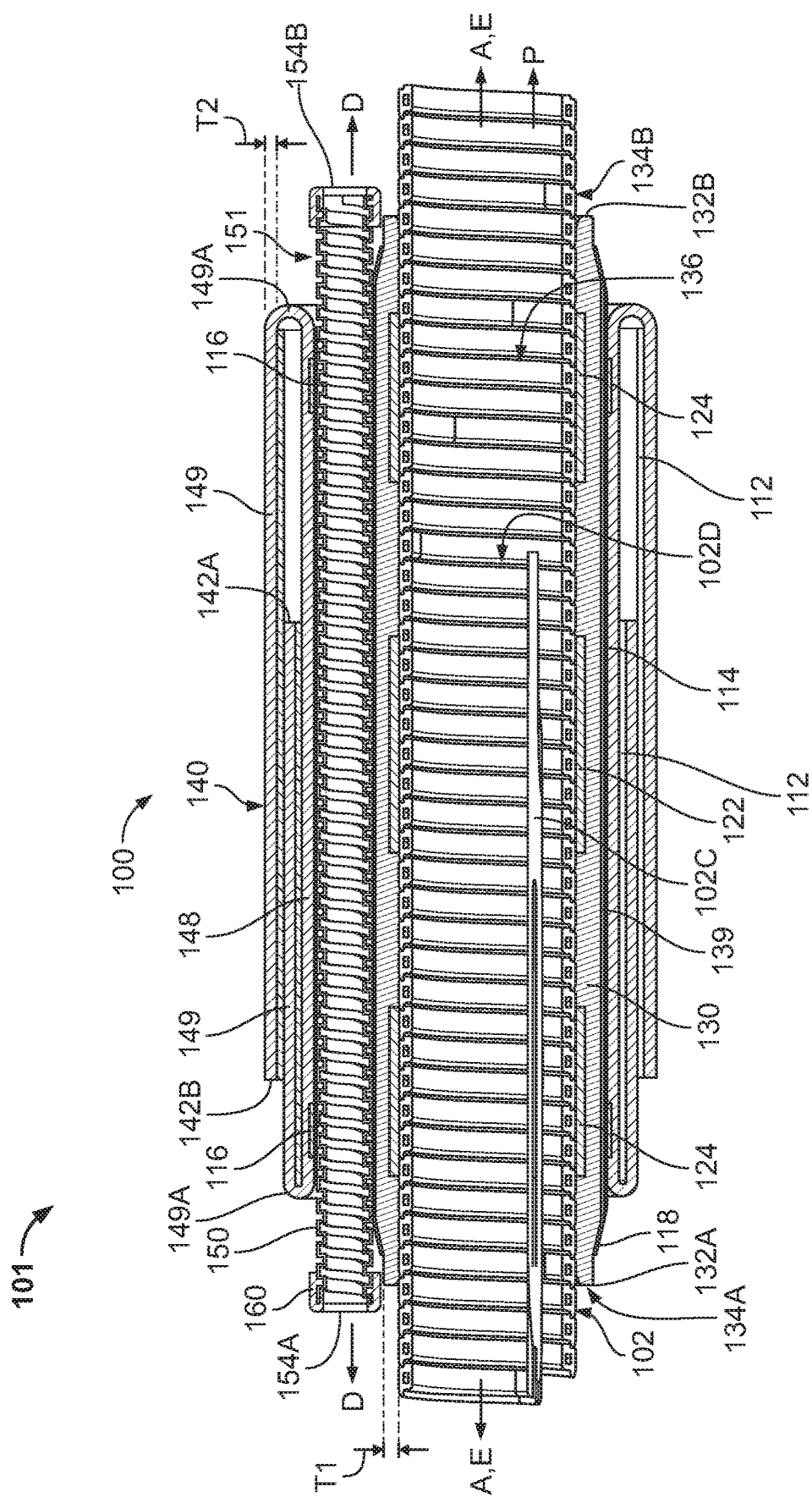

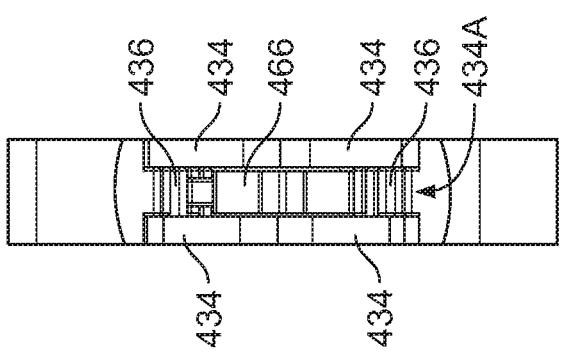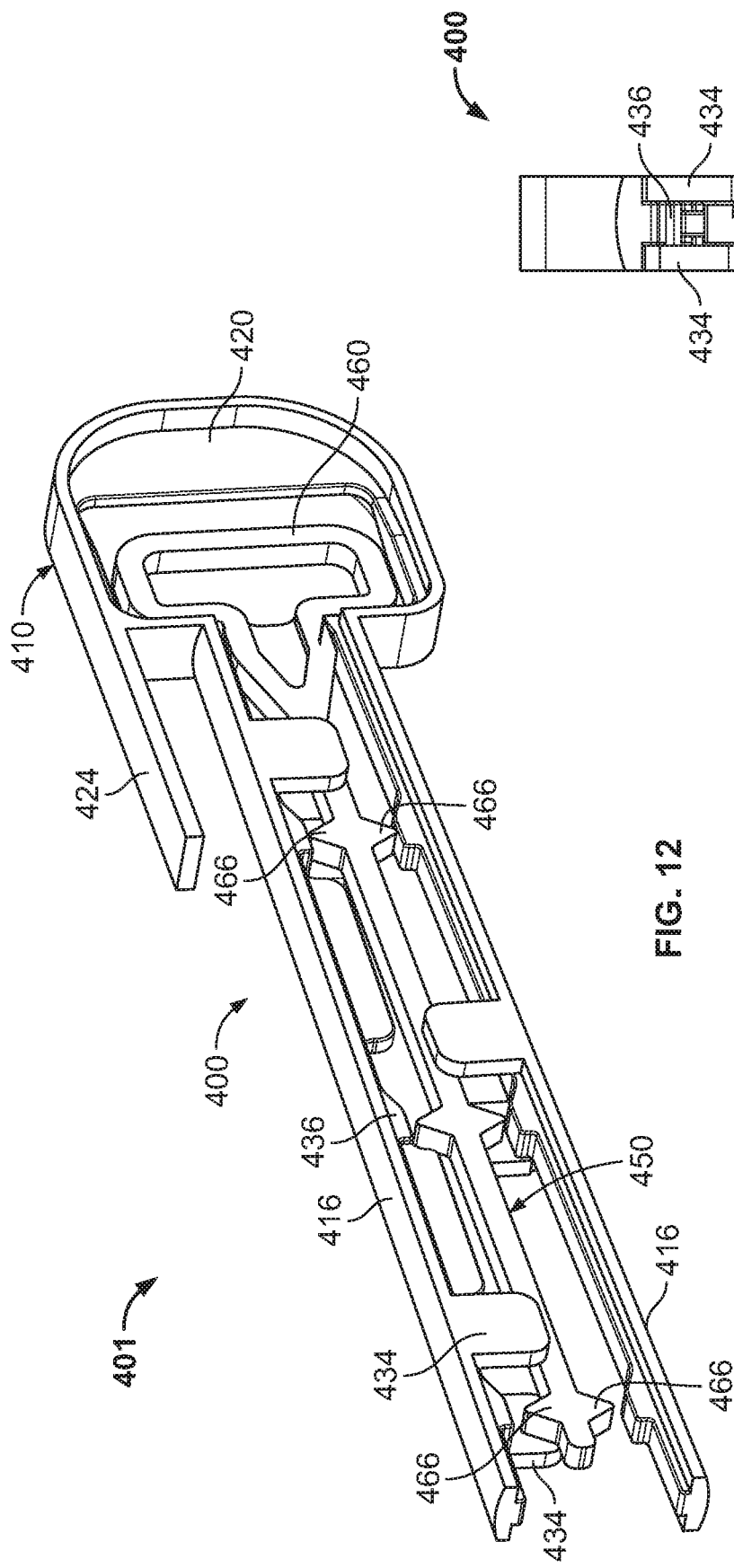

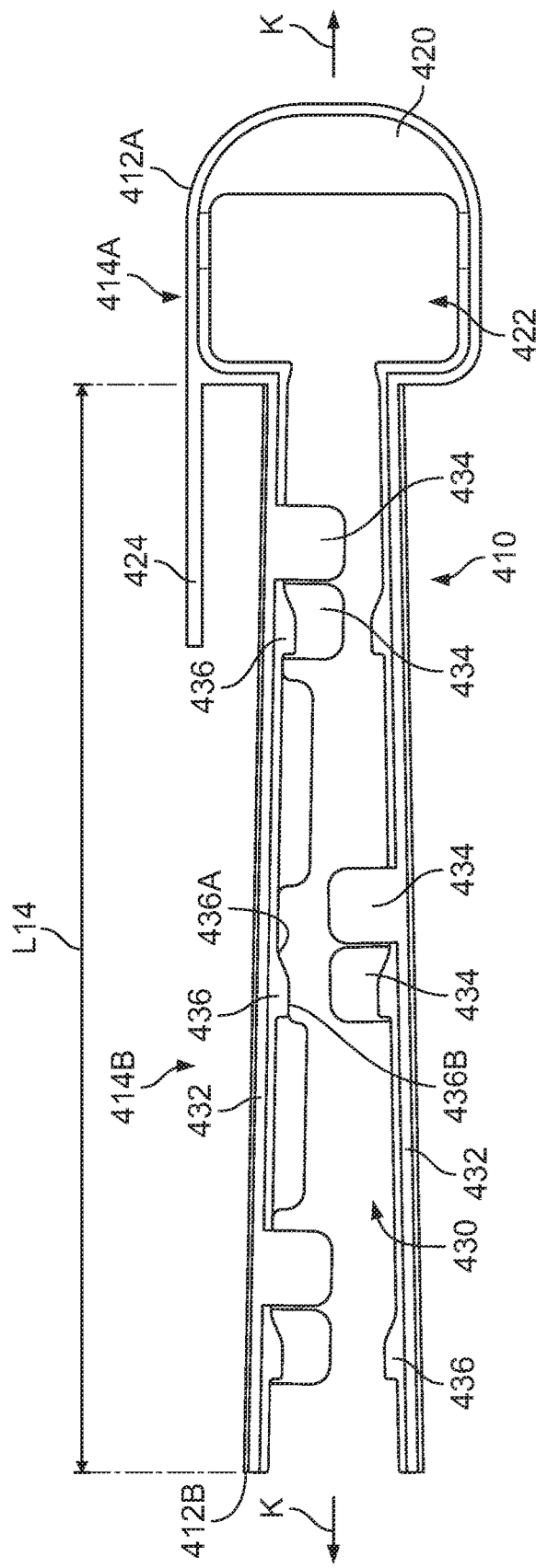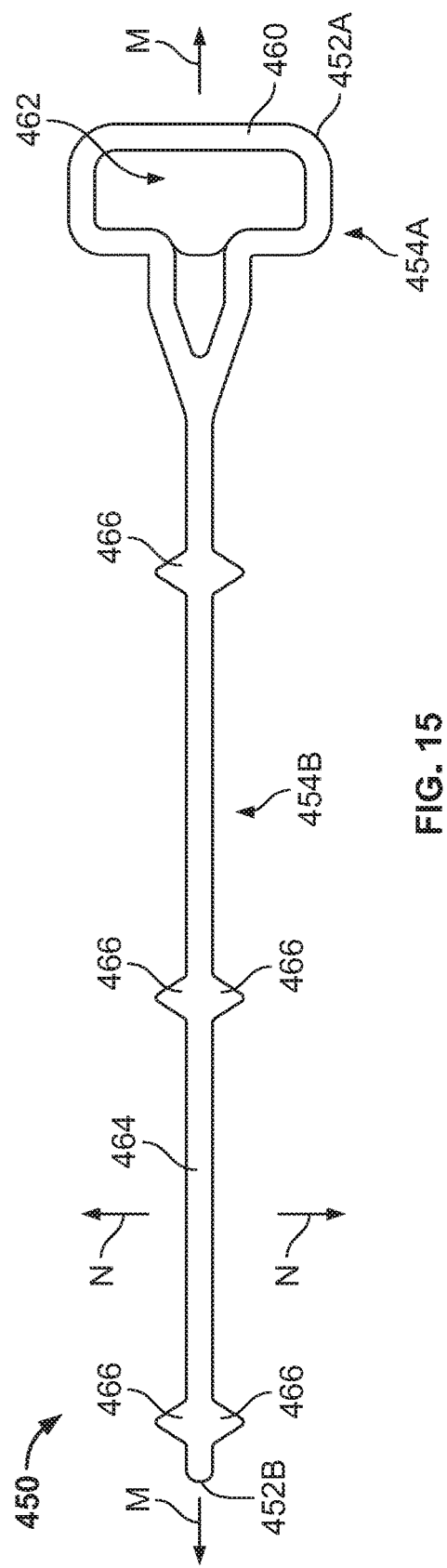

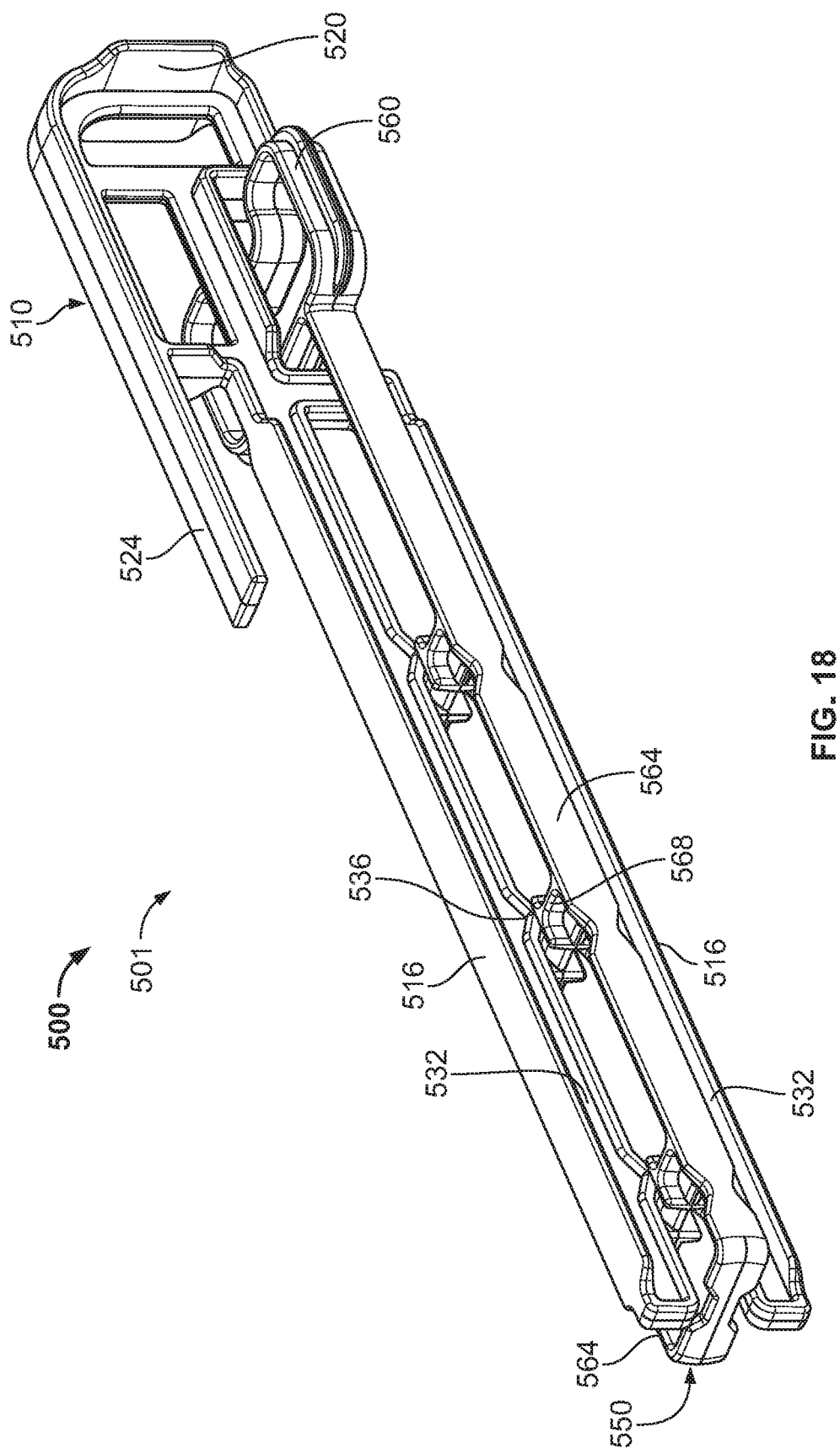

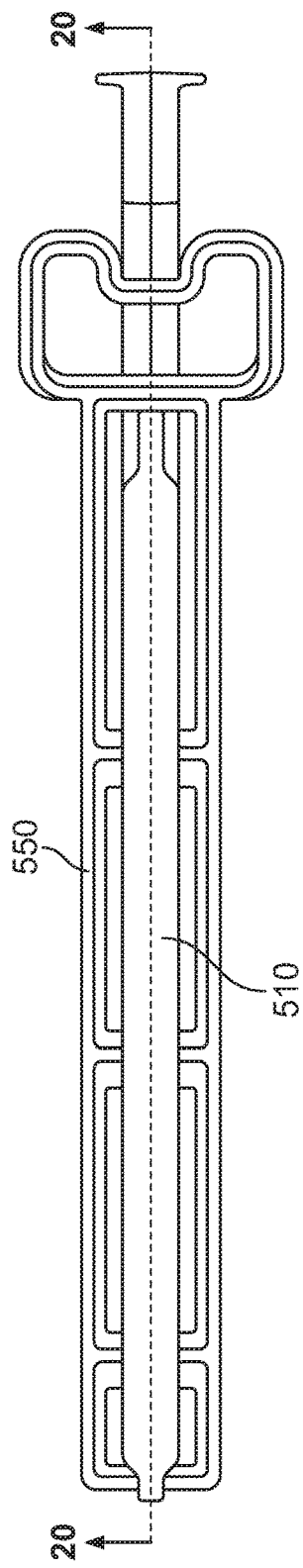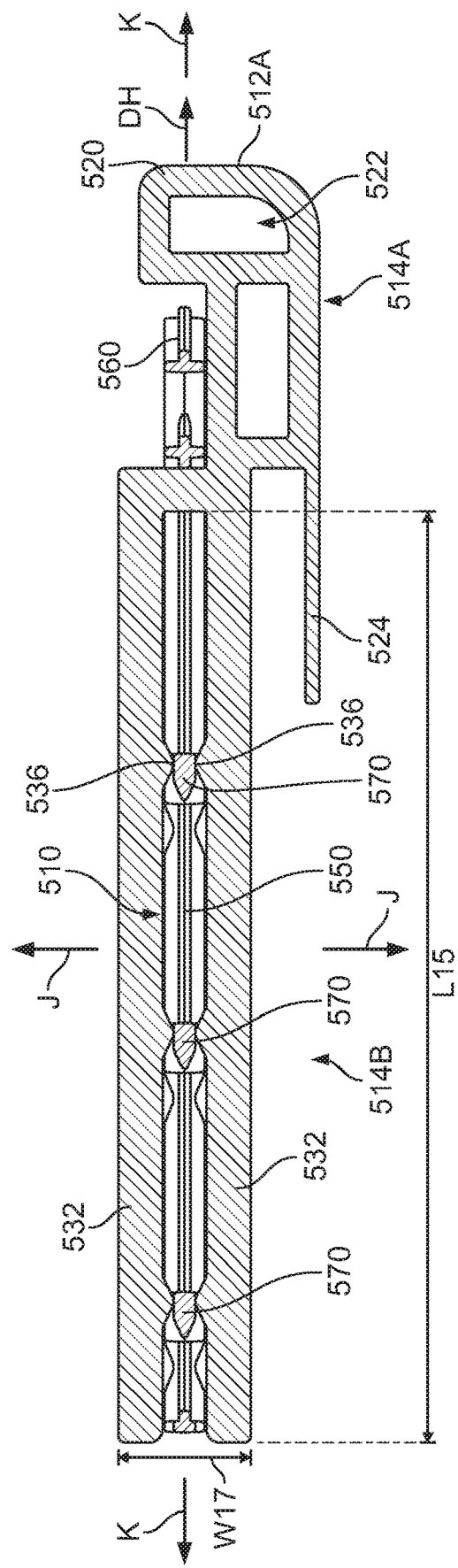

HOLDOUT SUPPORTS AND PRE-EXPANDED UNITS AND METHODS INCLUDING SAME

RELATED APPLICATION(S)

The present application is a continuation of U.S. application Ser. No. 15/720,694, filed Sep. 29, 2017, which claims the benefit of and priority from U.S. Provisional Patent Application No. 62/460,435, filed Feb. 17, 2017, the disclosures of which are incorporated herein by reference in entirety.

FIELD OF THE INVENTION

The present invention relates to electrical cables and connections and, more particularly, to protective covers for electrical cables and electrical connections.

BACKGROUND OF THE INVENTION

Cold shrinkable covers are commonly employed to protect or shield electrical power cables and connections (e.g., low voltage cables up to about 1000 V and medium voltage cables up to about 46 kV). One application for such covers is for splice connections between concentric neutral cables. A concentric neutral cable typically includes at least one primary conductor surrounded by a polymeric insulation layer, a conductive layer, one or more neutral conductors surrounding the conductive layer, and a polymeric jacket surrounding the neutral conductors. Examples of cold shrinkable covers for use with concentric neutral cables include the "All-in-One" CSJA Cold Shrinkable joint, available from TE Connectivity, which includes an integral neutral conductor mesh. It is also known to cover splices between concentric neutral cables using a cold shrink elastomeric cover tube (such as the CSJ product, a plastic closure for sealing and protecting electrical cable, available from TE Connectivity) in combination with a separate re-jacketing cover (such as the GelWrap™ cover product, available from TE Connectivity). In this case, the cold shrink tube is installed from a holdout over the primary conductors and the insulation layers, the neutral conductors are laid over the cold shrink tube, and the re-jacketing cover is subsequently wrapped around the neutral conductors and the insulation layer.

SUMMARY OF THE INVENTION

According to embodiments of the invention, an integral, unitary pre-expanded cover assembly unit for covering an electrical connection between first and second electrical cables each having a primary conductor and a neutral conductor includes a cover assembly, a holdout and a holdout support. The cover assembly includes an elastomeric sleeve and a duct. The elastomeric sleeve defines a cable passage to receive the electrical connection and the primary conductors of the first and second cables. The duct overlies the elastomeric sleeve. The duct defines a duct passage configured to receive at least one of the neutral conductors therethrough. The holdout is removably mounted within the cable passage of the elastomeric sleeve. The holdout defines a holdout passage. The holdout maintains the elastomeric sleeve in an expanded state. The holdout support is removably mounted within the holdout passage. The holdout support reinforces the holdout.

According to embodiments of the invention, a method for forming a connection assembly includes: forming an electrical connection between first and second electrical cables, the first and second cables each including a primary conductor and at least one neutral conductor; and providing an integral, unitary pre-expanded cover assembly unit. The pre-expanded cover assembly unit includes a cover assembly, a holdout and a holdout support. The cover assembly includes: an elastomeric sleeve defining a cable passage to receive the electrical connection and the primary conductors of the first and second cables; and a duct overlying the elastomeric sleeve, the duct defining a duct passage configured to receive at least one of the neutral conductors therethrough. The holdout is removably mounted within the cable passage of the elastomeric sleeve. The holdout defines a holdout passage. The holdout maintains the elastomeric sleeve in an expanded state. The holdout support is removably mounted within the holdout passage. The holdout support reinforces the holdout. The method further includes: removing the holdout support from the holdout passage; mounting the cover assembly on the cables such that the electrical connection and the primary conductors of the first and second cables extend through the cable passage and the holdout passage; inserting the at least one neutral conductor of the first cable through the duct passage; removing the holdout from the elastomeric sleeve; and coupling the at least one neutral conductor of the first cable with the at least one neutral conductor of the second cable.

According to embodiments of the invention, an integral, unitary pre-expanded cover assembly unit for covering an elongate substrate includes an elastomeric sleeve, a holdout and a holdout support. The elastomeric sleeve defines a sleeve passage to receive the elongate substrate. The holdout is removably mounted within the sleeve passage of the elastomeric sleeve. The holdout defines a holdout passage. The holdout maintains the elastomeric sleeve in an expanded state. The holdout support is removably mounted within the holdout passage. The holdout support reinforces the holdout. The holdout support is configured to be selectively transitioned from an expanded configuration in the holdout passage to a released configuration to facilitate removal of the holdout support from the holdout passage.

According to embodiments of the invention, a sleeve support assembly for supporting an elastomeric sleeve defining a sleeve passage to receive an elongate substrate includes a holdout and a holdout support. The holdout is configured to be removably mounted within the sleeve passage of the elastomeric sleeve. The holdout defines a holdout passage. The holdout maintains the elastomeric sleeve in an expanded state when mounted within the sleeve passage. The holdout support is removably mounted within the holdout passage. The holdout support reinforces the holdout. The holdout support is configured to be selectively transitioned from an expanded configuration in the holdout passage to a released configuration to facilitate removal of the holdout support from the holdout passage.

According to embodiments of the invention, a method for installing an elastomeric sleeve defining a sleeve passage on an elongate substrate includes providing a pre-expanded unit including: an elastomeric sleeve defining a sleeve passage to receive the elongate substrate; a holdout removably mounted within the sleeve passage of the elastomeric sleeve, the holdout defining a holdout passage, wherein the holdout maintains the elastomeric sleeve in an expanded state; and a holdout support removably mounted within the holdout passage, wherein the holdout support reinforces the holdout. The holdout support is configured to be selectively transitioned from an expanded configuration in the holdout passage to a released configuration to facilitate removal of the holdout support from the holdout passage. The method further includes: transitioning the holdout support from the expanded configuration to the released configuration; removing the holdout support from the holdout passage; mounting the elastomeric sleeve and the holdout on the elongate substrate such that the elongate substrate extends through the sleeve passage and the holdout passage; and removing the holdout from the elastomeric sleeve.

According to embodiments of the invention, an integral, unitary pre-expanded cover assembly unit for covering an elongate substrate includes an elastomeric sleeve, a holdout and a holdout support. The elastomeric sleeve defines a sleeve passage to receive the elongate substrate. The holdout is removably mounted within the elastomeric sleeve. The holdout defines a holdout passage. The holdout maintains the elastomeric sleeve in an expanded state. The holdout support is removably mounted within the holdout passage. The holdout support reinforces the holdout. The holdout support includes a first insert member and a second insert member. First insert member and the second insert member are independently removable from the holdout passage to facilitate removal of the holdout support from the holdout passage.

According to embodiments of the invention, a sleeve support assembly for supporting an elastomeric sleeve defining a sleeve passage to receive an elongate substrate includes a holdout and a holdout support. The holdout is configured to be removably mounted within the sleeve passage of the elastomeric sleeve. The holdout defines a holdout passage. The holdout maintains the elastomeric sleeve in an expanded state when mounted within the sleeve passage. The holdout support is removably mounted within the holdout passage. The holdout support reinforces the holdout. The holdout support includes a first insert member and a second insert member. The first insert member and the second insert member are independently removable from the holdout passage to facilitate removal of the holdout support from the holdout passage.

According to embodiments of the invention, a method for installing an elastomeric sleeve defining a sleeve passage on an elongate substrate includes providing a pre-expanded unit including: an elastomeric sleeve defining a sleeve passage to receive the elongate substrate; a holdout removably mounted within the sleeve passage of the elastomeric sleeve, the holdout defining a holdout passage, wherein the holdout maintains the elastomeric sleeve in an expanded state; and a holdout support removably mounted within the holdout passage, wherein the holdout support reinforces the holdout. The holdout support includes a first insert member and a second insert member. The first insert member and the second insert member are independently removable from the holdout passage to facilitate removal of the holdout support from the holdout passage. The method further includes: removing the holdout support from the holdout passage, including independently removing the first insert member and the second insert member from the holdout passage; mounting the elastomeric sleeve and the holdout on the elongate substrate such that the elongate substrate extends through the sleeve passage and the holdout passage; and removing the holdout from the elastomeric sleeve.

BRIEF DESCRIPTION OF THE DRAWINGS

FIG. 4 is a cross-sectional view of the pre-expanded cover assembly unit of FIG. 1 taken along the line 4-4 of FIG. 1.

FIG. 5 is a side view of an insert member forming a part of the pre-expanded cover assembly unit of FIG. 1.

FIG. 6 is a cross-sectional view of a cover assembly and a holdout device forming a part of the pre-expanded cover assembly unit of FIG. 1 taken along the line 4-4 of FIG. 1.

FIG. 12 is a perspective view of a holdout support according to further embodiments of the invention.

FIG. 13 is an end view of the holdout support of FIG. 12.

FIG. 14 is a side view of an outer insert member forming a part of the holdout support of FIG. 12.

FIG. 15 is a side view of an inner insert member forming a part of the holdout support of FIG. 12.

FIG. 18 is a perspective view of a holdout support according to further embodiments of the invention.

FIG. 19 is a bottom view of the holdout support of FIG. 18.

FIG. 20 is a cross-sectional view of the holdout support of FIG. 18 taken along the line 20-20 of FIG. 19, wherein a holdout support is in an expanded configuration.

DETAILED DESCRIPTION OF EMBODIMENTS OF THE INVENTION

Figure 1:
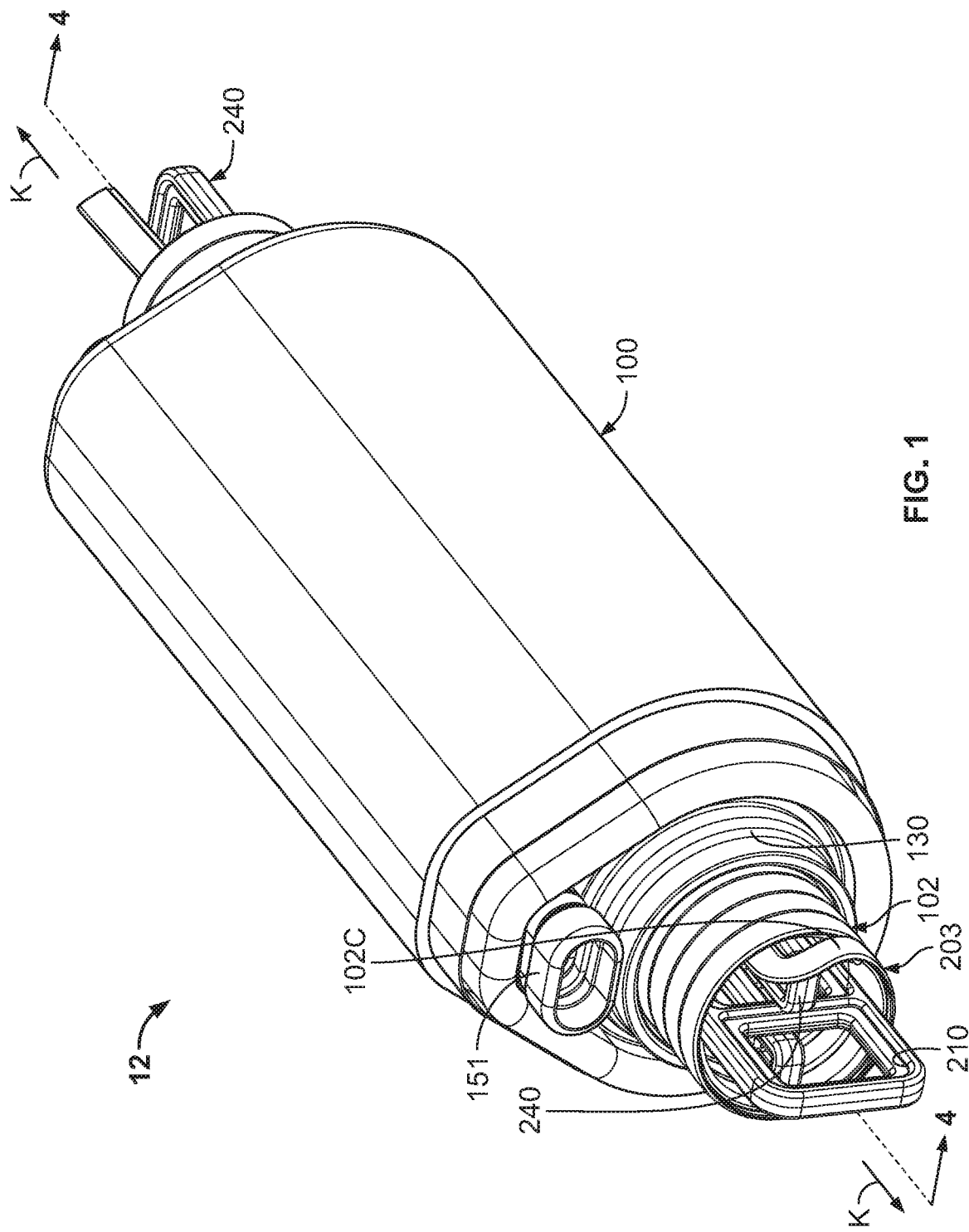
FIG. 1 is a perspective view of a pre-expanded cover assembly unit including a cover assembly and a holdout device according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, "monolithic" means an object that is a single, unitary piece formed or composed of a material without joints or seams.

With reference to FIGS. 1-10, a pre-expanded cover assembly unit 12 according to some embodiments of the present invention is shown therein. The pre-expanded cover assembly unit 12 includes a cover assembly 100, and a sleeve support assembly 203. The sleeve support assembly 203 includes a holdout device 102 and a holdout support 200. The holdout support 200 is assembled from a holdout support system 201, as discussed below.

In the pre-expanded cover assembly unit 12, the holdout device 102 maintains the cover assembly 100 in an expanded state or position. The holdout support 200 in turn supports or reinforces the holdout device 102 to resist undesired deformation of the holdout device 102 under the radially compressive load of the cover assembly 100. In particular, the holdout support 200 prevents, limits or resists radial deformation of the holdout device 102, as discussed in more detail below.

Figure 10:
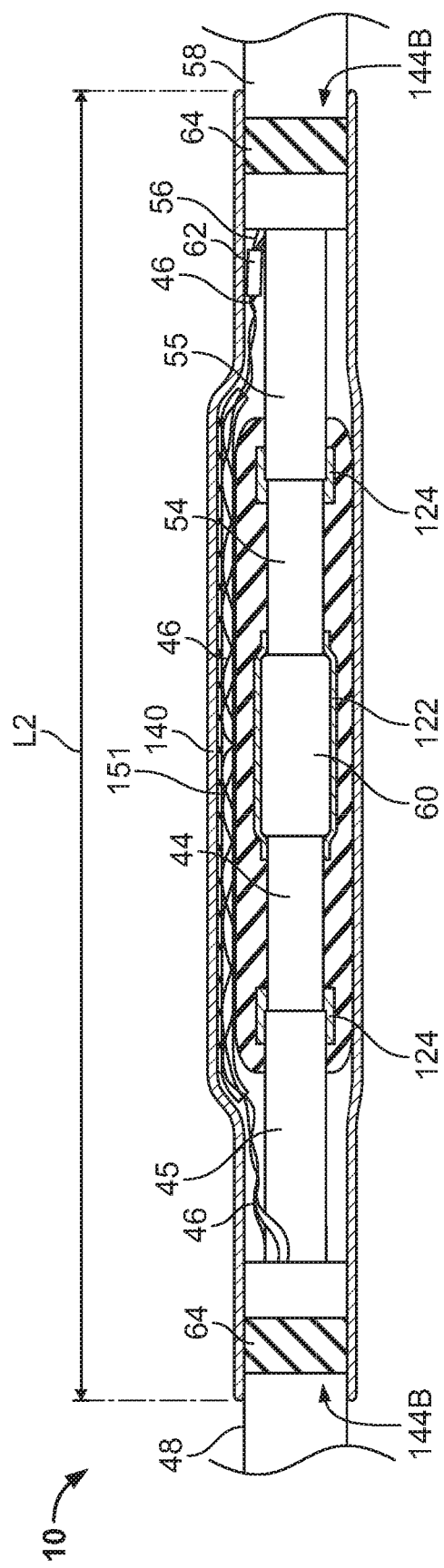
FIG. 10 is a cross-sectional view of a covered splice connection.

The cover assembly 100 may be used to cover and electrically insulate electrical substrates such as cables and connectors. The cover assembly 100 may be deployed from the holdout device 102 and mounted on the intended substrate in a retracted state or position as shown in FIG. 10 and discussed in more detail below. According to some embodiments, the cover assembly 100 is a cold shrink cover, meaning that it can be shrunk or retracted about the substrate without requiring the use of applied heat. The cover assembly 100 is exemplary and embodiments of the invention are not limited to use of the holdout support 200 with a cover assembly 100 as shown.

The cover assembly 100 includes a release layer 112, a metal contact layer 114, two duct retention bands or tapes 116, two metal contact layer retention bands or tapes 118, a Faraday cage layer 122, two stress cone layers 124, an inner sleeve (or insulation body) 130, a semiconductor layer 139, an outer sleeve (or re-jacket) 140, and a passthrough tube or duct 151. In some embodiments, the Faraday cage layer 122, the stress cone layers 124, and the inner sleeve 130 are bonded (e.g., adhered or molded) together to form a unitary component in the form of a sleeve assembly 131.

Figure 8:
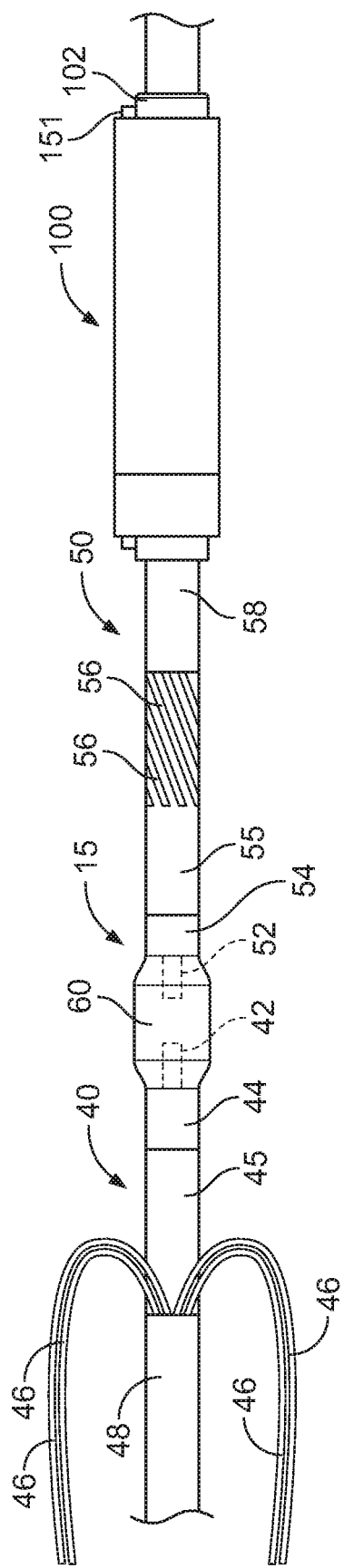
FIGS. 8 and 9 are side views illustrating procedures for installing the cover assembly of FIG. 1 on a pair of concentric neutral cables coupled by a connector.

The cover assembly 100 may be used to cover and seal a connection or splice between two or more cables 40, 50 including a connector 60 to form a connection assembly 10 as shown in FIGS. 8 and 10. According to some embodiments, the cables 40, 50 are concentric neutral cables.

Figure 2:
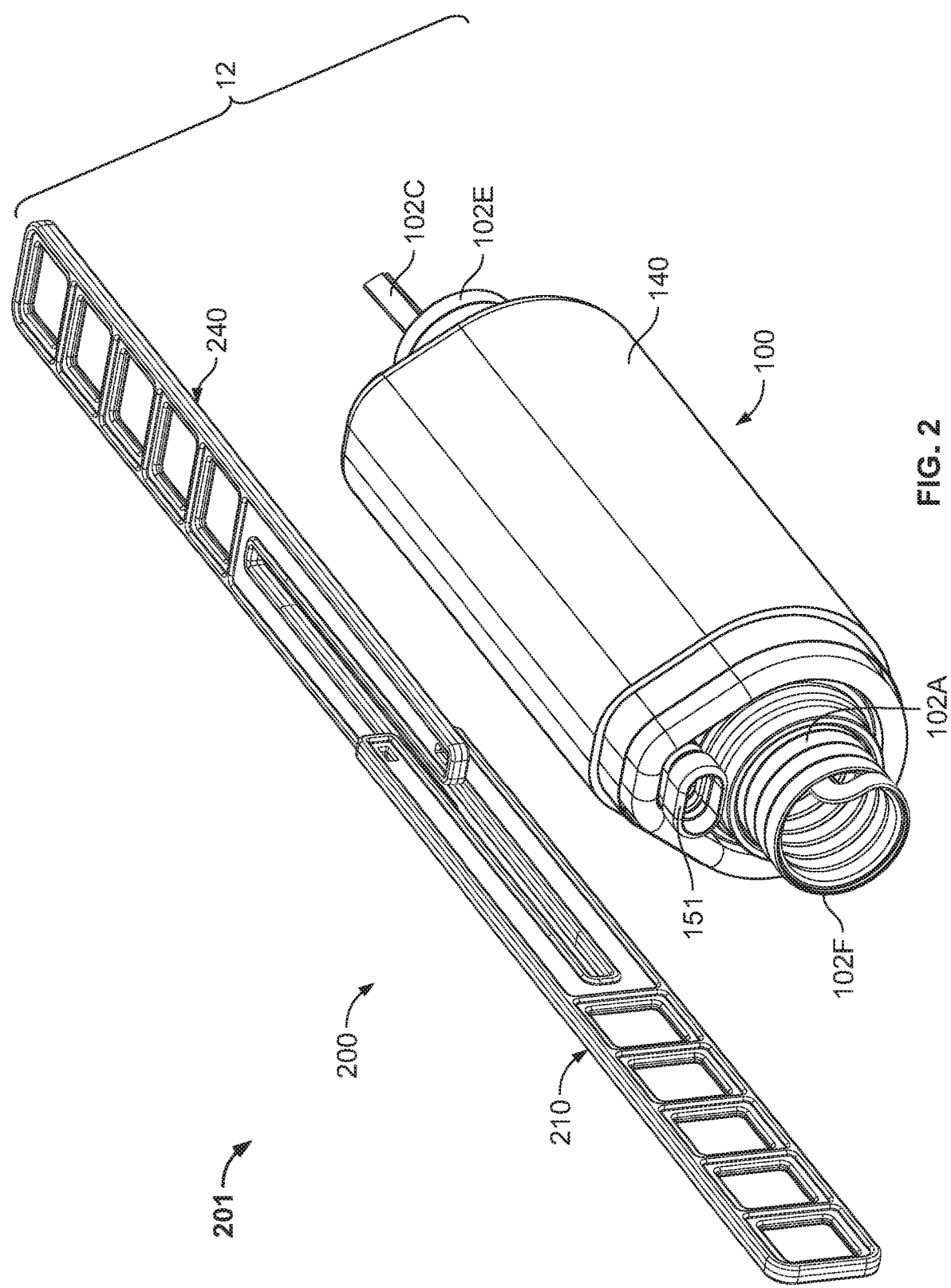
FIG. 2 is an exploded, perspective view of the pre-expanded cover assembly unit of FIG. 1.

FIG. 6 shows the pre-expanded unit 12 without the holdout support 200 installed in the holdout device 102, for the purpose of explanation. With reference to FIGS. 2 and 6, the cover assembly 100 has a lengthwise axis A-A. The Faraday cage layer 122, the stress cone layers 124, the inner sleeve 130, the semiconductor layer 139, the outer sleeve 140, and the duct 151 are provided as an integral, unitary structure extending lengthwise along the axis A-A. According to some embodiments, the cover assembly 100 is provided pre-installed and pre-expanded on the holdout 102.

The inner sleeve 130 has opposed ends 132A, 132B. The inner sleeve 130 is tubular and defines an axially extending conductor through passage 136 that communicates with opposed end openings 134A, 134B.

The Faraday cage layer 122 is illustrated as a generally tubular sleeve bonded to the inner surface 120 of the inner sleeve 130. The Faraday cage layer 122 may be formed of a suitable elastically conductive elastomer. In use, the Faraday cage layer 122 may form a Faraday cage to provide an equal potential volume about the connector 60 so that an electric field is cancelled in the surrounding air voids.

The stress cone layers 124 are illustrated as generally tubular sleeves bonded to the inner surface 130A of the inner sleeve 130 at either end 132A, 132B thereof. The stress cone layers 124 may be formed of a suitable electrically conductive elastomer. In use, the stress cone layers 124 may serve to redistribute the voltage along the surface of the cable insulation 44, 54 to reduce or prevent the degradation of the insulation 44, 54 that might otherwise occur.

According to some embodiments, the layers 122, 124 are formed of a material having a Modulus at 100 percent elongation (M100) in the range of from about 0.68 to 0.88 MPa.

The semiconductor layer 139 fully circumferentially surrounds the inner sleeve 130. According to some embodiments, the semiconductor layer 139 is coextensive with the inner sleeve 130.

The metal contact layer 114 is an electrically conductive, tubular sleeve surrounding and contacting the semiconductor layer 139. In some embodiments, the metal contact layer 114 is a copper mesh wrap or sock. The metal contact layer 114 is secured to the inner sleeve 130 by the tape wraps 118. The tapes 118 may be vinyl, adhesive-backed tape, for example.

The outer sleeve 140 has opposed ends 142A, 142B. The outer sleeve 140 is tubular and defines an axially extending conductor through passage that communicates with opposed end openings 144A, 144B (FIG. 10). When mounted on the holdout 102 as shown in FIGS. 2, 4 and 6, outer sections 149 of the outer sleeve 140 are folded back on an intermediate section 148 of the outer sleeve 140 at annular folds 149A.

The release layers 112 are tubular sleeves surrounding the outer sleeve 140 between each folded back outer section 149 and the opposing underlying portion of the outer sleeve 140. The release layers 112 reduce friction and binding between the overlying portions of the outer sleeve 140 so that the outer sections 149 can be more easily slid or rolled into their extended positions as discussed below. The release layers 112 may be formed of a polymeric material (e.g., vinyl) mesh. The release layers 112 may also be provided with a lubricant (e.g., grease).

The illustrated duct 151 is a tubular assembly including a tubular duct sleeve or body 150 and a pair of end caps or covers 160 mounted on the opposed ends of the duct body 150. The duct 151 has a lengthwise axis D-D extending substantially parallel to the cover assembly axis A-A. The duct 151 is secured to the inner sleeve 130 over the copper mesh 114 by the tape wraps 116. The tapes 116 may be vinyl, adhesive-backed tape, for example.

The duct body 150 is tubular and elongate. In some embodiments, the duct body 150 is flexible. The duct body 150 has a lengthwise axis extending substantially parallel to, and in some embodiments substantially concentric with, the lengthwise axis D-D of the duct assembly 151. The duct body 150 has an inner surface defining an axially extending neutral conductor through passage 156 terminating at and communicating with opposed end openings 154A, 154B.

The duct body 150 may be configured to bend about a primary bend axis that is transverse to the lengthwise axis D-D, while also providing good crush resistance to radial loads.

The semiconductor layer 139 can be formed of any suitable electrically semiconductive material. According to some embodiments, the semiconductor layer 139 is formed of an elastically expandable material. According to some embodiments, the semiconductor layer 139 is formed of an elastomeric material. According to some embodiments, the semiconductor layer 139 is formed of carbon black and silicone. Other suitable materials may include carbon black and EPDM.

The inner sleeve 130 can be formed of any suitable material. According to some embodiments, the inner sleeve 130 is formed of a dielectric or electrically insulative material. According to some embodiments, the inner sleeve 130 is formed of an elastically expandable material. According to some embodiments, the inner sleeve 130 is formed of an elastomeric material. According to some embodiments, the inner sleeve 130 is formed of liquid silicone rubber (LSR). Other suitable materials may include EPDM or ethylene propylene rubber (EPR). According to some embodiments, the inner sleeve 130 has a Modulus at 100 percent elongation (M100) in the range of from about 0.4 to 0.52 MPa.

According to some embodiments, the thickness T1 (FIG. 6) of the inner sleeve 130 is in the range from about 0.07 to 2 inches. According to some embodiments, the length of the inner sleeve 130 is in the range from about 8 to 30 inches.

The outer sleeve 140 can be formed of any suitable material. According to some embodiments, the outer sleeve 140 is formed of an electrically insulative material. According to some embodiments, the outer sleeve 140 is formed of an elastically expandable material. According to some embodiments, the outer sleeve 140 is formed of an elastomeric material. According to some embodiments, the outer sleeve 140 is formed of ethylene propylene diene monomer (EPDM) rubber. Other suitable materials may include neoprene or other rubber. According to some embodiments, the outer sleeve 140 has a Modulus at 100 percent elongation (M100) in the range of from about 0.6 to 1.1 MPa.

According to some embodiments, the thickness T2 (FIG. 6) of the outer sleeve 140 is in the range of from about 0.03 to 0.25 inch. According to some embodiments, the length L2 (FIG. 10) of the outer sleeve 140 is in the range of from about 15 to 35 inches. According to some embodiments, the length of each outer section 149 of the outer sleeve 140 is in the range of from about 10 to 90 percent of the length L2.

According to some embodiments, the duct body 150 has a width in the range of from about 0.5 to 2.0 inches. According to some embodiments, the duct body 150 has a radial height in the range of from about 0.25 to 1.0 inches. According to some embodiments, the length of the duct 151 is in the range of from about zero to 3 inches greater or shorter than the length of the inner sleeve 130.

In some embodiments, the passage 156 has a height in the range of from about 0.125 to 1.0 inch. In some embodiments, the passage 156 has a width in the range of from about 0.25 to 2 inches.

While the duct 151 as illustrated extends beyond the full length of the inner sleeve 130, according to other embodiments, the duct extends only partially (i.e., a distance less than the full length) across the inner sleeve 130.

The duct body 150 can be formed of any suitable material. According to some embodiments, the duct body 150 is formed of a flexible material that is geometrically configured to permit or enable flexibility of the duct body 150 as described herein. In some embodiments, the duct body 150 is formed of a semi-rigid material that is geometrically configured to permit or enable flexibility of the duct body 150 as described herein. In some embodiments, the duct body 150 is formed of a semi-rigid or rigid material and includes integral joints, joint features or joint mechanisms that permit or enable flexibility of the duct body 150 as described herein. In some embodiments, the joints enable the duct body 150 to bend at prescribed locations along the length of the duct body 150.

According to some embodiments, the duct body 150 is formed of an electrically conductive material. According to some embodiments, the duct body 150 is formed of metal. According to some embodiments, the duct body 150 is formed of a polymeric material. According to some embodiments, the duct body 150 is formed of an electrically conductive plastic.

In some embodiments, the duct body 150 is a tubular, flexible corrugated conduit. In some embodiments, the duct body 150 is a helically corrugated tube or an annularly corrugated tube. In some embodiments, the corrugated conduit is formed of metal (e.g., galvanized steel). In some embodiments, the duct body 150 is a tubular, flexible stripwound conduit including a helically wound strip. The stripwound conduit may have an engaged profile or, alternatively, an interlocked profile.

According to some embodiments, the duct body 150 is formed of a material having an Elastic Modulus in the range of from about 2 GPa to 3.5 GPa and, in some embodiments, in the range of from about 0.5 GPa to 2 GPa.

According to some embodiments, the nominal thicknesses of the walls of the duct body 150 are in the range of from about 0.02 to 0.063 inch.

According to some embodiments, the holdout 102 includes a flexible strip 102A helically wound to form a holdout body in the form of a rigid cylinder 102B having a central lengthwise axis E-E and defining a holdout passage 102D. The strip 102A includes a pull cord 102C extending from a distal end 102E of the cylinder 102B and through the passage 102D and beyond the proximal end 102F of the cylinder 102B.

The holdout device 102 may be factory installed. The holdout 102 can be formed of any suitable material. According to some embodiments, the holdout 102 is formed of a semi-rigid or rigid plastic. In some embodiments, the holdout 102 is formed of polypropylene, PVC or ABS.

The cover assembly 100 may be formed by any suitable method and apparatus. According to some embodiments, the inner sleeve 130 is molded and the outer sleeve 140 is thereafter insert overmolded about the inner sleeve 130 with the duct 151 and other components interposed therebetween.

According to further embodiments, the inner sleeve 130 and the outer sleeve 140 are separately formed (for example, by molding or extrusion) and thereafter the outer sleeve 140 is mounted on the inner sleeve 130 with the duct 151 and other components interposed therebetween.

According to some embodiments, the inner sleeve 130 is unitarily molded. According to some embodiments, the outer sleeve 140 is unitarily molded. Alternatively, the inner sleeve 130 and/or the outer sleeve 140 may be extruded. According to some embodiments, the inner sleeve 130 and/or the outer sleeve 140 is unitarily extruded.

The holdout support 200 includes a first insert member 210 and a second insert member 240. The first insert member 210 will be described in more detail hereinbelow. The insert members 210, 240 may be constructed in the same or similar manner and configuration and, therefore, it will be appreciated that the description of the insert member 210 likewise applies to the insert member 240. In some embodiments, the insert members 210, 240 are substantially identical.

The insert member 210 has opposed ends 212A, 212B. The insert member 210 has a lengthwise axis K-K and a lateral axis J-J perpendicular to the lengthwise axis K-K. The axis K-K is parallel to or concentric with the lengthwise axis E-E of the holdout 102 in the assembly 203. The insert member 210 has an outer portion 214A extending from the outer end 212A and an inner portion 214B extending from the inner end 212B. Opposed lateral edges 216 extend lengthwise substantially parallel to the axis K-K, from end 212A to end 212B.

A longitudinally extending receiver slot 220 is defined in the inner portion 214B and is open at the inner end 212B. The slot 220 defines opposed longitudinally extending legs 222. Openings or eyelets 224 are defined in the inner ends of the legs 222.

The outer portion 214A may be provided with a handle 230 and laterally extending crossbars 226 defining openings or voids 228 therebetween.

Figure 3:
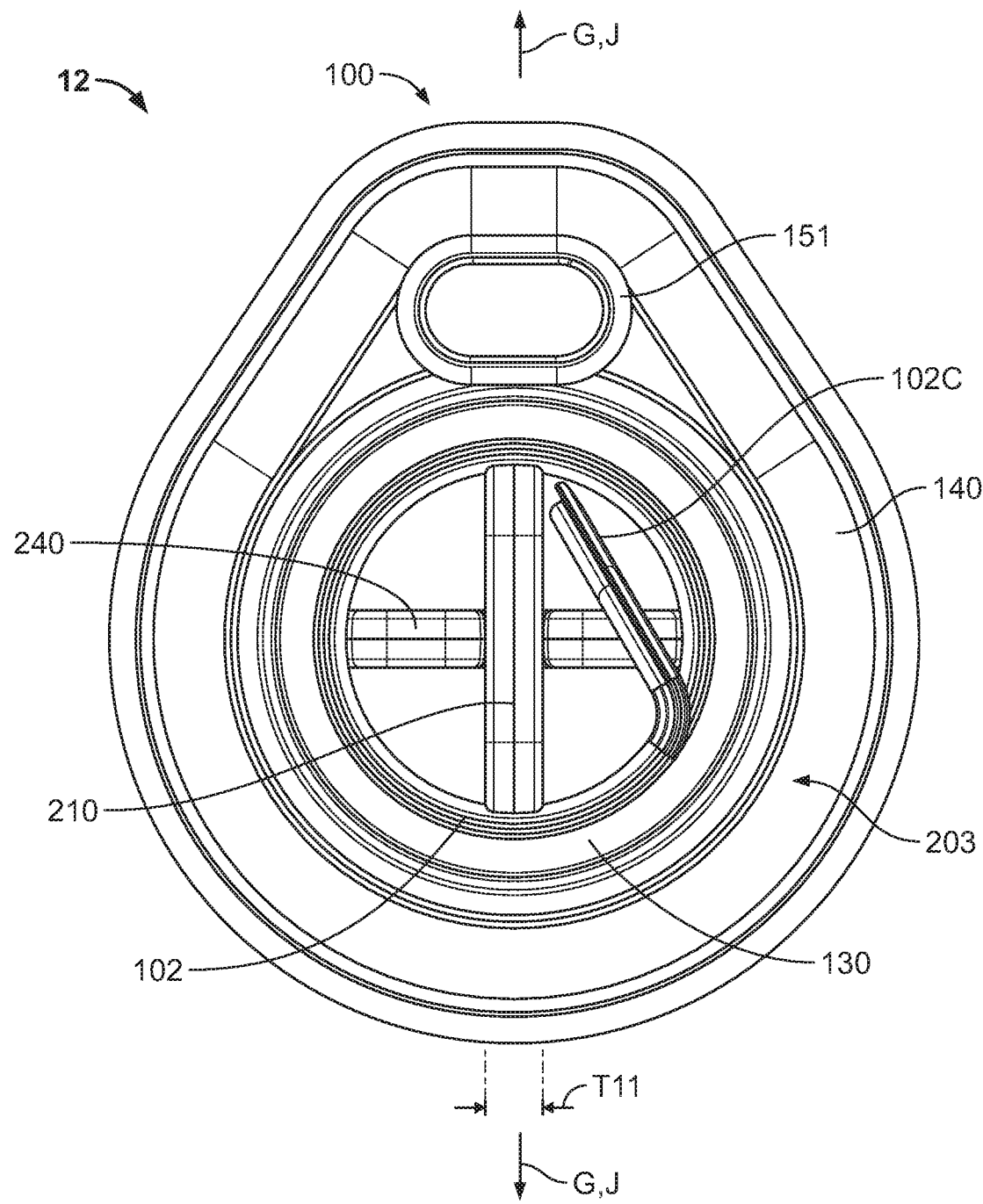
FIG. 3 is an end view of the pre-expanded cover assembly unit of FIG. 1.

The insert members 210, 240 are assembled into the holdout support 200 by relatively orienting the insert members 210, 240 at a 90 degree angular offset and inserting each insert member 210, 240 into the receiver slot 220 of the other as shown in FIGS. 1, 3 and 4. The insert members 210, 240 are thereby secured in a criss-cross configuration with their respective lengthwise axes K-K substantially parallel and their respective lateral axes J-J substantially perpendicular. In this way, the insert members 210, 240 form a generally "t" or "+" profile, shape or configuration in lateral cross-section (FIG. 3).

The assembled holdout support 200 extends from an end 200A to an end 200B. According to some embodiments, the length L9 (FIG. 4) of the holdout support 200 is in the range of from about 6 to 35 inches. According to some embodiments, the length L9 is greater than the length of the holdout 102. According to some embodiments, the length L9 is in the range of from about 1 inch greater or less than the length of the holdout 102.

The insert members 210, 240 can be formed of any suitable material. According to some embodiments, the insert members 210, 240 are formed of a polymeric material. According to some embodiments, the insert members 210, 240 are formed of a semi-rigid or rigid plastic. In some embodiments, the insert members 210, 240 are formed of polypropylene, PVC or ABS.

The insert members 210, 240 may each be formed by any suitable technique. According to some embodiments, each insert member 210, 240 is extruded and cut to length and shape. According to some embodiments, each insert member 210, 240 is molded (e.g., injection molded). In some embodiments, each insert member 210, 240 is a unitary, monolithic structure.

According to some embodiments, the insert members 210, 240 are formed of a material having an Elastic Modulus in the range of from about 2.0 GPa to 3.5 GPa and, in some embodiments, in the range of from about 0.5 GPa to 2.0 GPa.

According to some embodiments, the thickness T11 (FIG. 3) of each insert member 210, 240 is in the range of from about 2 to 20 mm.

According to some embodiments, the lengthwise depth L12 (FIG. 5) of each slot 220 is in the range of from about 120 to 300 mm. According to some embodiments, the width W12 (FIG. 5) of each slot 220 is in the range of from about 6 to 90 mm.

The pre-expanded unit 12 can be assembled or manufactured as follows in accordance with methods of the invention. The holdout 102 is provided having an initial or relaxed inner diameter. The holdout support 200 is assembled as described above from the insert members 210, 240. The holdout support 200 is then inserted into the passage 102D of the holdout 102 as shown in FIGS. 1, 3 and 4. Alternatively, the insert members 210, 240 may be individually inserted into the passage 102D to assemble the holdout support 200 in the passage. The sleeve support assembly 203 is thereby constructed.

In some embodiments, the holdout pull cord 102C is removed from the holdout passage 102D to make room for insertion of the insert members 210, 240 into the holdout passage 102D. The pull cord 102C may be inserted through one or both of the eyelets 224 of one of the insert members 210, 240 so that when the insert member 210, 240 is inserted into the passage 102D, the pull cord 102C is thereby reinserted into or re-routed through the passage 102D.

In some embodiments, the widths W11 of the insert members 210, 240 are chosen such that the holdout support 200 can be slid into the passage with little resistance. According to some embodiments, the lateral width W11 (FIG. 5) of each insert member 210, 240 is substantially the same as the relaxed inner diameter of the holdout 102 before the elastically expanded inner sleeve 130 is mounted on the holdout 102. In some embodiments, the lateral width W11 is in the range of from about 0 to 3 mm less than the relaxed inner diameter of the holdout 102.

The inner sleeve 130 and remaining components of the cover assembly 100 are thereafter mounted on the holdout 102 (i.e., on the sleeve support assembly 203). In particular, the inner sleeve 130 is mounted on the holdout 102 in an elastically expanded state. The inner diameter of the inner sleeve 130 in a relaxed state is less than the outer diameter of the holdout 102 and, as a result, the holdout 102 maintains the inner sleeve 130 in an elastically radially expanded state. The outer sleeve 140 may also be maintained in an elastically radially expanded state.

A duct position axis G-G (FIG. 3) is defined by the central axis D-D of the duct 151 and a central axis E-E of the holdout device 102 (i.e., the duct position axis G-G is perpendicular to and intersects each of the axes D-D and E-E). According to some embodiments and as shown in FIG. 3, the holdout support 200 is angularly oriented with respect to the cover assembly 100 such that the lateral axis J-J of the insert member 210 is substantially parallel to or aligned with the duct position axis G-G.

As discussed above, the inner sleeve 130 surrounds the holdout device 102 in a radially elastically expanded state. As a result, the inner sleeve member 130 retains an elastic recovery force and applies a persistent radially compressive load on the holdout device 102 tending to force the holdout device 102 to compress or deform radially inward.

This radially compressive load may reduce the inner diameter of the holdout device 102 along one or more lateral or radial axes. In particular, in the absence of the holdout support 200, the compressive load may deform or ovalize the holdout device 102 into an eccentric or noncircular cross-sectional shape. For example, the holdout device 102 may assume an oval cross-sectional shape. Typically, the major axis of the oval would extend substantially perpendicular to the duct position axis G-G and the minor axis of the oval would extend substantially parallel to the duct position axis G-G.

However, the holdout support 200 reinforces the holdout device 102 to prevent or limit the deformation of the holdout device 102 by the radially compressive load of the cover assembly 100. In this way, the holdout support 200 prevents or limits deformation of the cross-sectional shape of the holdout device 102. For example, the holdout support 200 may prevent the holdout device 102 from becoming noncircular (e.g., oval) in the cross-sectional shape or limit the extent to which the holdout device 102 becomes noncircular. In some embodiments, the holdout support is configured to permit a limited amount of such deformation. In some embodiments, the permitted amount of deformation is less than 10 percent along any lateral axis and, in some embodiments, is in the range of from about 0 to 5 mm. The limited deformation causes the holdout device 102 to exert a gripping force on the holdout support 200 so that the holdout support 200 is retained in the passage 102D by a limited interference fit.

As discussed above, the lateral axis J-J of the insert member 210 is substantially aligned with the duct position axis G-G. As such the insert member 210 is positioned and oriented to counteract the greatest compressive load along its load axis, which substantially coincides with the duct position axis G-G.

The insert members 210, 240 together provide multiple axis support to the holdout device 102.

The holdout support 200 can provide resistance to warpage or deformation of the holdout device 102 as described above at different stages during the life of the pre-expanded unit 12. The holdout support 200 can provide resistance to warpage or deformation of the holdout device 102 during assembly of the pre-expanded unit 12 (i.e., as the cover assembly 100 is being mounted on the holdout device 102), during storage of the pre-expanded unit 12, and during transport of the pre-expanded unit 12. Notably, the pre-expanded unit 12 may be exposed to temperature fluctuations and external loads tending to deform the holdout device 102, which are likewise resisted by the holdout support.

Figure 7:
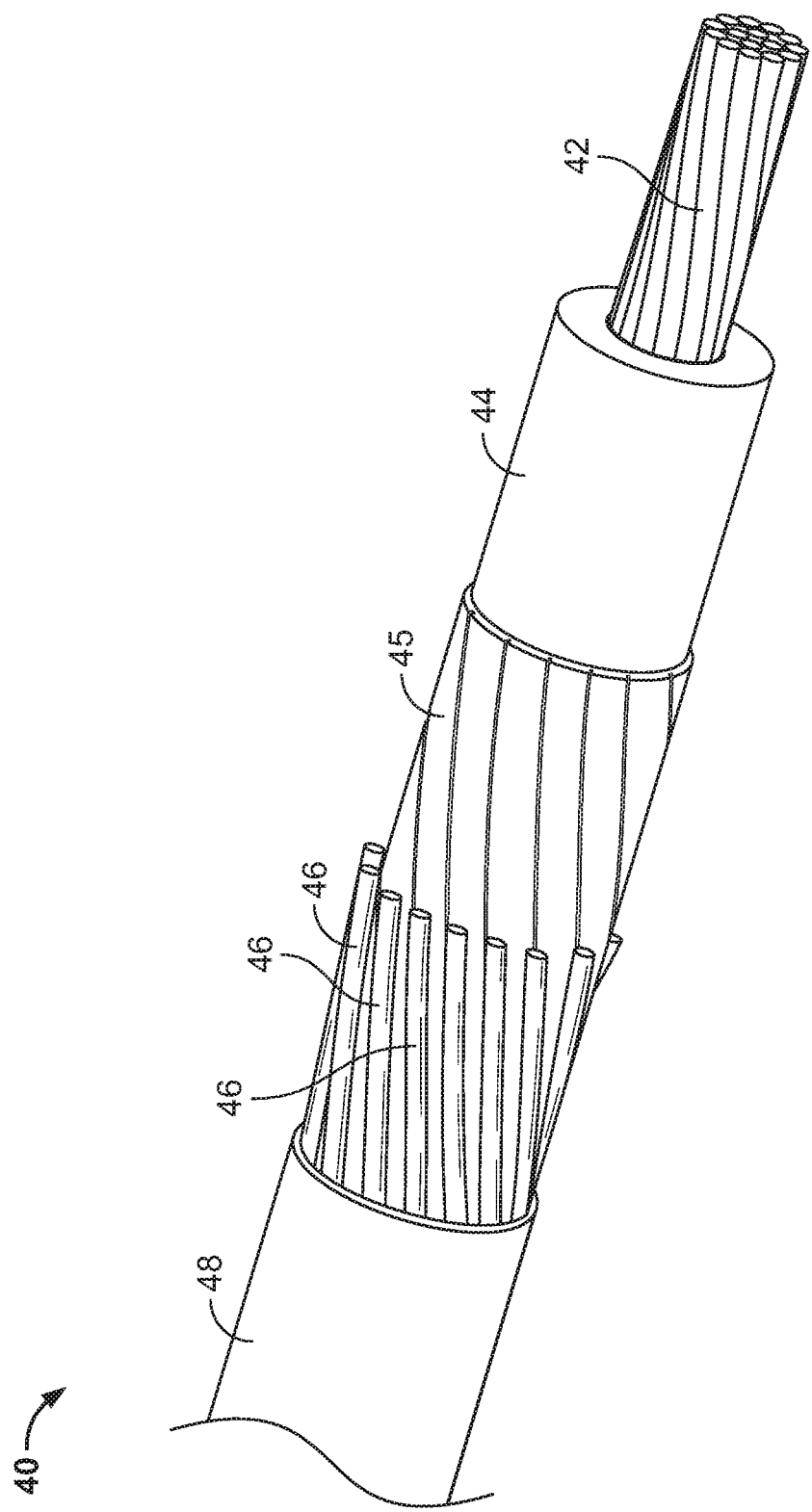
FIG. 7 is a perspective view of an exemplary concentric neutral cable.
Figure 9:
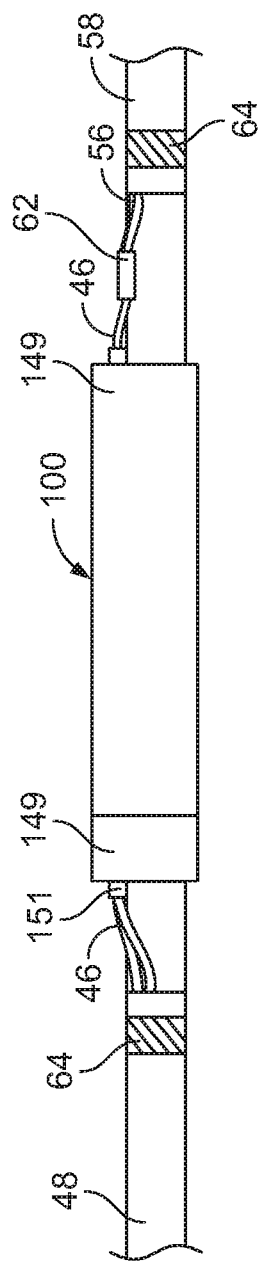

Referring now to FIGS. 8-10, the pre-expanded unit 12 may be used in the following manner to apply the cover 100 over a splice connection 15 (FIG. 8) between a pair of electrical power transmission cables 40, 50 to form a connection assembly 10. According to some embodiments, the cables 40, 50 are low-voltage or medium-voltage (e.g., between about 5 and 46 kV) power transmission cables. As shown in FIG. 7, the cable 40 includes a primary electrical conductor 42, a polymeric insulation layer 44, a semiconductor layer 45, one or more neutral conductors 46, and a jacket 48, with each component being concentrically surrounded by the next. According to some embodiments and as shown, the neutral conductors 46 are individual wires, which may be helically wound about the semiconductor layer 45. The primary conductor 42 may be formed of any suitable electrically conductive materials such as copper (solid or stranded). The polymeric insulation layer 44 may be formed of any suitable electrically insulative material such as crosslinked polyethylene (XLPE) or EPR. The semiconductor layer 45 may be formed of any suitable semiconductor material such as carbon black with silicone. The neutral conductors 46 may be formed of any suitable material such as copper. The jacket 48 may be formed of any suitable material such as EPDM. The cable 50 is similarly constructed with a primary electrical conductor 52, a polymeric insulation layer 54, a semiconductor layer 55, one or more neutral conductors 56, and a jacket 58 corresponding to components 42, 44, 45, 46 and 48, respectively.

The connection assembly 10 may be formed and the cover assembly 100 may be installed as follows. The cables 40, 50 are prepared as shown in FIG. 8 such that a segment of each layer extends beyond the next overlying layer, except that the neutral conductors 46 of the cable 40 extend at least a prescribed distance beyond the end of the primary conductor 42. This excess length of the conductors 46 can be folded back away from the terminal end of the primary conductor 42 as shown in FIG. 8.

The holdout support 200 is withdrawn (i.e., pulled or pushed) from the passage 102D of the holdout device 102 so that the cover assembly 100 remains expanded on the holdout 102 as shown in FIG. 6. The holdout support 200 may be withdrawn from the passage 102D as a unit, or the insert members 210, 240 may be individually withdrawn. In some embodiments, the insert member 240 is removed and the insert member 210 is removed thereafter in order to reduce the force required to remove the insert member 210. The insert members 210, 240 may be discarded or reused in another pre-expanded unit 12.

After the holdout support 200 has been removed from the holdout device 102, the pre-expanded unit 12 is slid over the cable 50 as shown in FIG. 8. According to some embodiments, the inside diameter of the holdout 102 is greater than the outer diameter of each cable 40, 50 such that the inner diameter of the holdout 102 is sufficient to receive the prepared cable 40, 50 and the connector 60 without undue effort. According to some embodiments, the inner diameter of the holdout 102 is at least as great as the outer diameter of the largest portion of the cables or connectors that are to be received in the passage 136. The pre-expanded unit 12 may be retained or parked on the cable 50 until the operator is ready to install the cover assembly 100 on the cables 40, 50.

The electrical connector 60 is secured to each primary conductor 42, 52 to mechanically and electrically couple the primary conductors 42, 52 to one another as shown in FIG. 8. The connector 60 may be any suitable type of connector such as a metal crimp connector.

The pre-expanded unit 12 is then slid into position over the connector 60. The holdout 102 is then removed from the cover assembly 100, thereby permitting the elastomeric sleeves 130, 140 to relax and radially retract about the cables 40, 50 and the connector 60. According to some embodiments, the inner sleeve 130 overlaps and engages the semiconductor layers 44, 54 of the cables 40, 50.

More particularly and with reference to FIG. 6, the holdout 102 is removed by pulling the pull cord 102C through the passage 102D in a withdrawal direction P (i.e., from the distal end 102E to the proximal end 102F). As a result, the strip 102A is progressively removed from the distal end 102E, causing the cylinder 102B to progressively disintegrate from the distal end 102E. This in turn permits the inner sleeve 130 and the outer sleeve 140 to contract radially inwardly. This process is continued until the cylinder 102B is fully disintegrated and the strip 102A removed from the inner sleeve 130.

The excess length of the neutral conductors 46 is routed or threaded through the passage 156 of the duct 151.

The neutral conductors 46 are then electrically and mechanically coupled to the neutral conductors 56 by any suitable neutral connector 62 as shown in FIG. 9. The neutral connector 62 may be any suitable connector such as a metal crimp connector. As shown in FIG. 9, the neutral conductors 46, 56 of the two cables 40, 50 may be coupled to one another on only one side of the connector 60. Alternatively, the neutral conductors 46, 56 may be coupled to one another on both sides of the connector 60.

Strips of sealant 64 may be applied to the outer surfaces of the cable jackets 48, 58. The operator then rolls each of the extension sections 149 of the outer sleeve 140 axially outwardly to cover the adjacent sections of the cables 40 and 50, respectively. According to some embodiments, at least a portion of each extension section 149 overlaps a respective portion of each cable jacket 48, 58 and engages the associated sealant strip 64 to provide a moisture seal. The cover assembly 100 is thereby fully installed to form the connection assembly 10 as shown in FIG. 10.

Alternatively, the neutral conductors 46 can be routed through the duct 151 before the holdout 102 has been removed and the cover assembly 100 has been initially secured about the splice connection 15.

According to further embodiments, the cover assembly 100 may include more than one duct 151 and the ducts may be disposed at different positions about the circumference of the cover assembly 100. In this case, the neutral conductors 46 can routed through two or more of the duct assemblies.

In some embodiments, a second duct is located circumferentially substantially opposite the duct 151 on the duct position axis G-G, so that the lateral axis J-J of the insert member 210 is substantially aligned with both ducts.

The relaxed inner diameter of the outer sleeve 140 is less than at least the outer diameter of the jacket layers 48, 58. Therefore, the outer sleeve 140 exerts a radially inwardly compressive or clamping force or pressure (due to elastic tension) onto the cables 40, 50. The outer sleeve 140 thereby effects a liquid tight seal at the interface between the cable jackets 48, 58 and the outer sleeve 140. This seal can protect the cable and the splice from the ingress of environmental moisture. According to some embodiments the relaxed inner diameter of the inner sleeve 130 is at least 10% less than the smallest diameter cable upon which the cover assembly 100 is intended to be installed.

Cover assemblies and methods of the present invention and as described herein can provide a number of advantages. The cover assembly 100 provides an "all-in-one" integral unit that can be installed in similar fashion to known cold shrink splice cover insulating tubes and that also accommodates the neutral conductors of concentric neutral cables. The cover assembly 100 including the inner sleeve 130, the outer sleeve 140 and the duct 151 can be preassembled at a factory. Therefore, it is not necessary to provide and install a separate and supplemental rejacketing cover to cover the neutral conductors (which must be electrically insulated from the primary conductors 42, 52 and the primary connector 60).

The cover assembly 100 can also provide advantages over known "all-in-one" integral units of the type wherein an electrically conductive mesh is incorporated into the cover assembly to engage and provide continuity between the neutral conductors (typically, copper tapes) of the concentric neutral cables. In particular, in the case of these known cover assemblies, the electrically conductive mesh may not be sufficiently conductive to provide the amount of continuity desired or required. For example, the neutral conductors of the cables being spliced may have a greater combined gauge than that of the connecting mesh. By permitting the use of the original neutral conductors of the cables 40, 50, the cover assembly 100 can ensure that the neutral conductors provided across the cover assembly 100 and the splice connection 15 are of the proper gauge. In this way, adequate continuity between the cables 40, 50 can be ensured.

The cover assemblies and methods of the present invention also permit the operator to form the connection with only a single connection (for example, crimp connection) between the neutral conductors of one cable and the neutral conductors of the other cable. Moreover, this configuration permits the operator to form the connection with a crimp on only one side of the splice.

Figure 11:
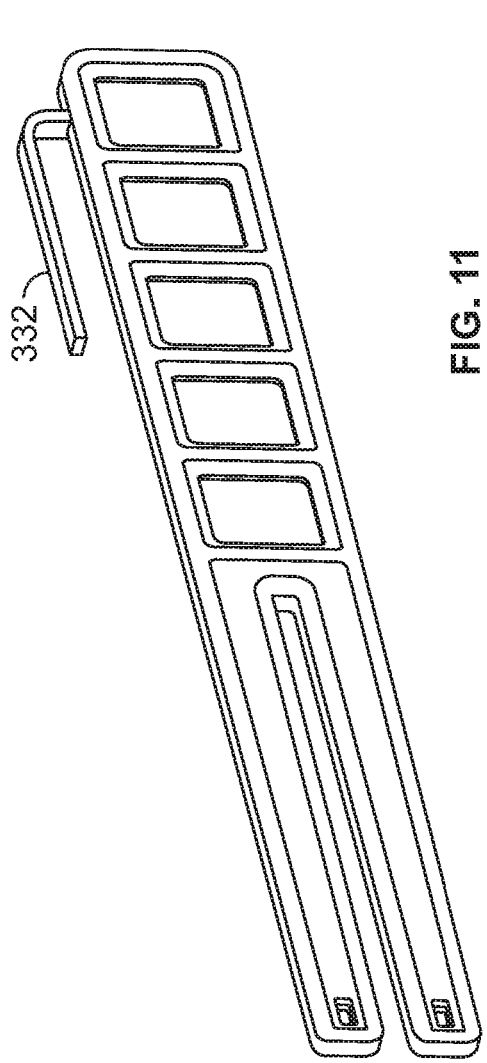
FIG. 11 is a perspective view of an insert member according to further embodiments of the invention.

With reference to FIG. 11, an insert member 310 according to further embodiments is shown therein. The insert member 310 can be used in place of the insert member 210. The insert member 310 may also be used in place of the insert member 240.

The insert member 310 differs from the insert member 210 in that the insert member 310 is additionally provided with a duct locator or angular alignment feature 332 in the form of an elongate post. In use, the angular alignment feature 332 is inserted into the passage 156 of the duct 151 as described below for the duct locator feature 424 of the holdout support 400. The angular alignment feature 332 can thereby serve to positively locate and angularly orient the insert member 310 and the holdout support including the insert member 310 with respect to the duct 151 and the cover member 100.

With reference to FIGS. 12-17, a pre-expanded cover assembly unit 14 according to further embodiments of the present invention is shown therein. The pre-expanded cover assembly unit 14 includes the cover assembly 100 and a sleeve support assembly 403. The sleeve support assembly 403 includes the holdout device 102 and a holdout support 400. The holdout support 400 is assembled from a holdout support system 401, as discussed below.

In the pre-expanded cover assembly unit 14, the holdout device 102 maintains the cover assembly 100 is in an expanded state or position as described above with regard to the pre-expanded cover assembly unit 12. The holdout support 400 in turn supports the holdout device 102 to resist undesired deformation of the holdout device 102 under the load of the cover assembly 100. In particular, the holdout support 400 prevents, limits or resists radial deformation of the holdout device 102.

The cover assembly 100 may be used, deployed from the holdout device 102, and mounted on an intended substrate as described above with regard to the pre-expanded cover assembly unit 12, except that the holdout support 400 is constructed and operated differently than the holdout support 200.

The holdout support 400 includes a first or outer insert member 410 and a second or inner insert member 450.

The outer insert member 410 has opposed ends 412A, 412B. The outer insert member 410 has a lengthwise axis K-K and a lateral axis J-J perpendicular to the lengthwise axis K-K. The axis K-K extends parallel to the lengthwise axis E-E of the holdout 102 in the assembly 403. The outer insert member 410 has an outer portion 414A extending from the outer end 412A and an inner portion 414B extending from the inner end 412B. Opposed lateral edges 416 extend lengthwise substantially parallel to the axis K-K, from proximate end 412A to end 412B.

The outer portion 414A includes a handle 420 and a recess or opening 422. The outer portion 414A also includes a duct locator or angular alignment feature 424 in the form of an elongate post.

The inner portion 414B includes opposed, longitudinally extending legs 432, which include the opposed lateral edges 416. Each leg 432 is cantilevered and extends from a base end secured to the outer portion 414A proximate the handle 420 to a free end at the inner end 412B. A longitudinally extending receiver slot 430 is defined by and between the legs 432.

Figure 25:
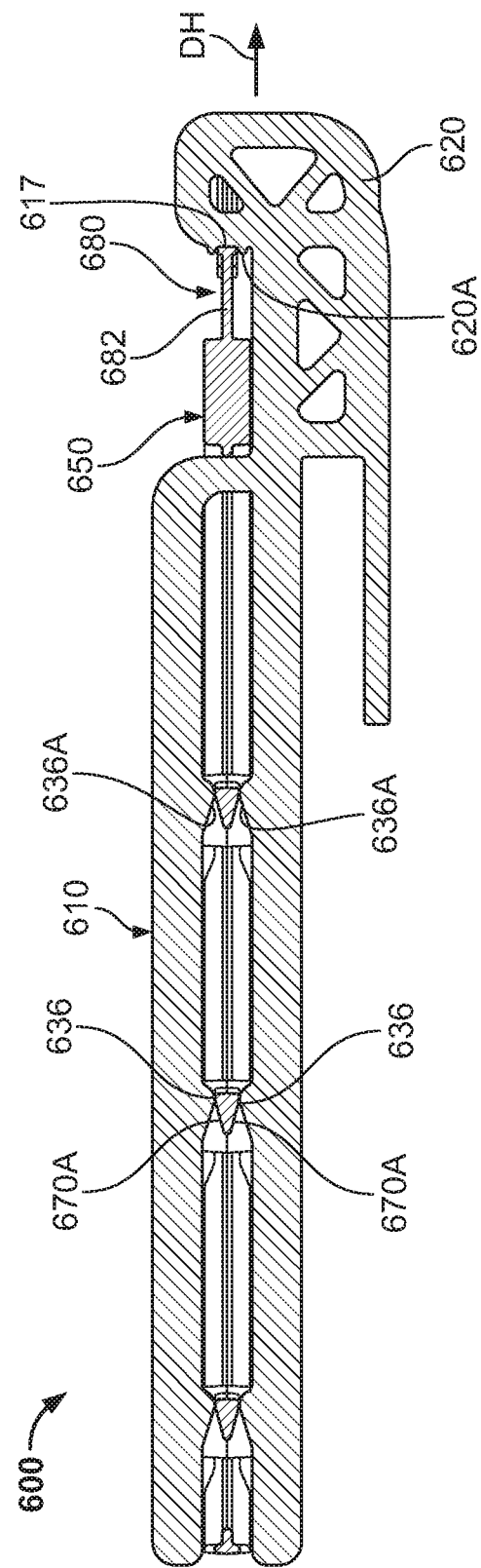
FIG. 25 is a cross-sectional view of the holdout support of FIG. 23 taken along the line 25-25 of FIG. 23, wherein the holdout support is in a locked and expanded configuration.

Each leg 432 includes a series of integral, longitudinally spaced apart, laterally inwardly extending lateral retention features or tabs 434. As can be seen in FIG. 25, the retention tabs 434 are provided in pairs of tabs 434 that are laterally offset from one another to define a track or gap 434A therebetween.

Each leg 432 includes a series of integral, longitudinally spaced apart, laterally inwardly extending actuator features 436. Each actuator feature 436 includes a ramped surface 436A and a land surface 436B.

The inner insert member 450 has opposed ends 452A, 452B. The insert member 450 has a lengthwise axis M-M and a lateral axis N-N perpendicular to the lengthwise axis M-M. The axis M-M extends parallel to the axis K-K. The insert member 450 has an outer portion 454A extending from the outer end 452A and an inner portion 454B extending from the inner end 452B.

The outer portion 454A includes a handle 460 and a recess or opening 462.

The inner portion 454B includes a longitudinally extending elongate body 464, which extends cantilevered from a base end secured to the outer portion 454A proximate the handle 460 to a free end at the inner end 452B.

A series of integral, opposed, longitudinally spaced apart actuator features 466 extend laterally outwardly from opposed lateral sides of the elongate body 464. Each actuator feature 466 includes a ramped surface 466A.

Figure 16:
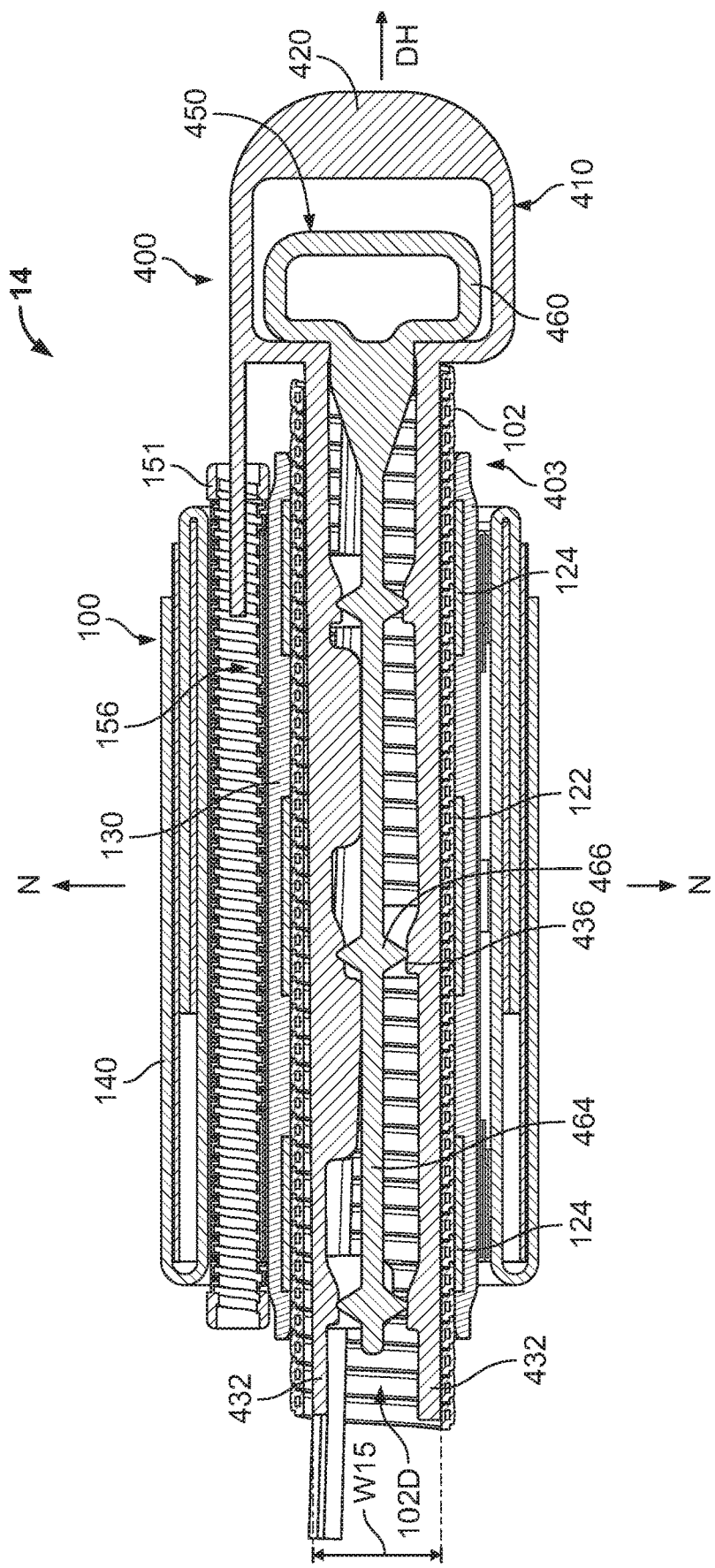
FIG. 16 is a cross-sectional view of a pre-expanded cover assembly unit including the holdout support of FIG. 12, wherein the holdout support is in an expanded configuration.

The insert members 410, 450 are assembled into the holdout support 400 by inserting the inner insert member 450 into the outer insert member 410 with their respective lengthwise axes K-K, M-M substantially parallel as shown in FIG. 12. As shown in FIGS. 12 and 16, the handle 460 is seated in the recess 422 and the elongate body 464 is positioned in the slot 430 between the legs 432. The elongate body 464 is seated in the gaps 434A between the retention tabs 434 so that the elongate body 464 is laterally retained in the outer insert member 410. The inner insert member 450 is located in a forward position relative to the outer insert member 450 as shown in FIG. 16 such that the actuator features 466 are positioned laterally between opposed pairs of actuator feature lands 436B.

Figure 17:
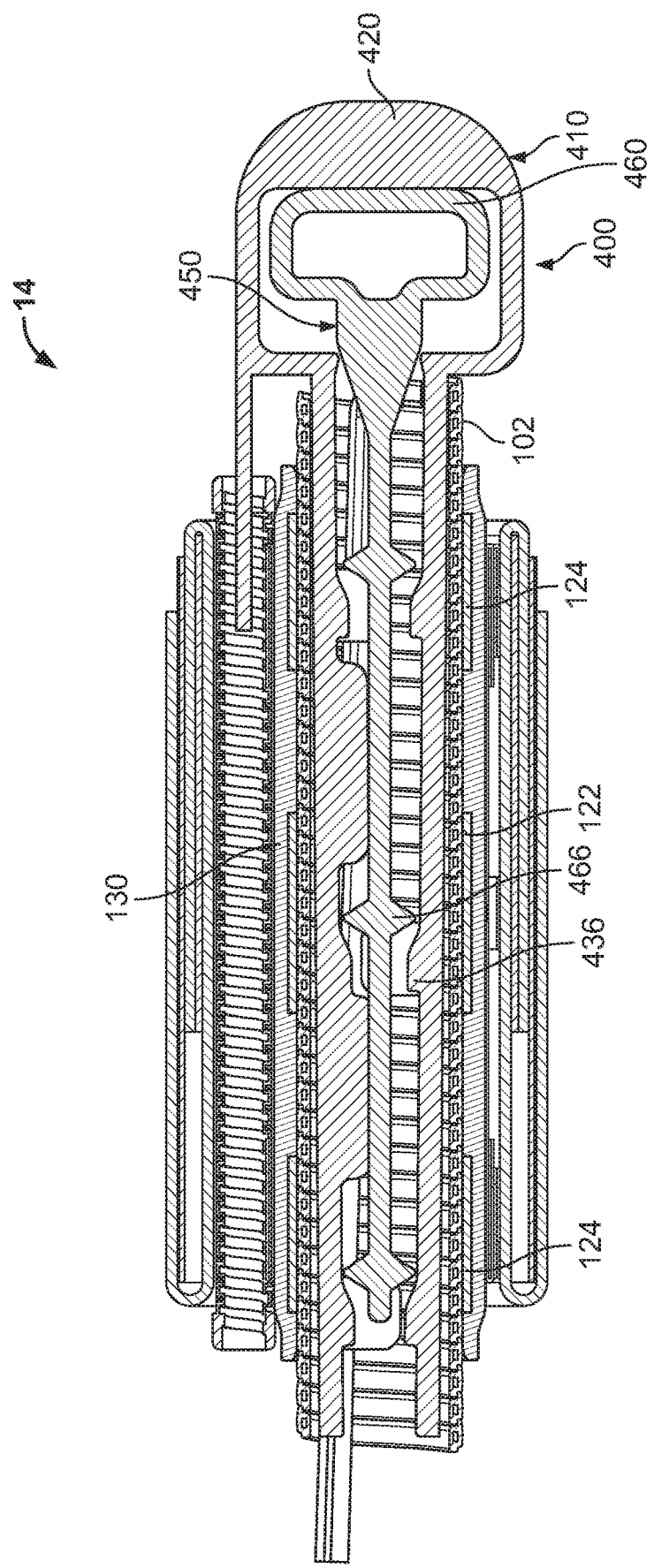
FIG. 17 is a cross-sectional view of the pre-expanded cover assembly unit of FIG. 16, wherein the holdout support is in a released configuration.

This position (FIG. 16) may be referred to as the expanded configuration of the holdout support 400. In the expanded position, the legs 432 (and thereby the lateral edges 416) are prevented or limited from deflecting laterally inward by the abutment between the actuator features 466 and the actuator feature lands 436B. In the expanded configuration, the width of the legs 432 is limited to no less than the width W15 (FIG. 16). The holdout support 400 can be transitioned to a released configuration as shown in FIG. 17 by pulling the insert member 450 rearwardly (i.e., in a direction DH) relative to the insert member 410, thereby pulling the actuator features 466 out of abutment with the actuator feature lands 436B. In the released configuration, the legs 432 (and thereby the lateral edges 416) can be displaced radially inwardly to a width narrower than the expanded width W15.

According to some embodiments, the length L14 (FIG. 14) of the each leg 432 is in the range of from about 6 to 35 inches. According to some embodiments, the length L14 is greater than the length of the holdout 102. According to some embodiments, the length L14 is in the range of from about 1 inch greater or less than the length of the holdout 102.

The insert members 410, 450 can be formed of a material or materials as discussed above for the insert members 210, 240. The insert members 410, 450 can be formed using a technique or techniques as described above for the insert members 210, 240. According to some embodiments, each insert member 410, 450 is a unitary, monolithic structure.

According to some embodiments, the thickness of each insert member 410, 450 is in the range of from about 2 to 20 mm.

The pre-expanded unit 14 can be assembled or manufactured as follows in accordance with methods of the invention. The holdout 102 is provided having an initial or relaxed inner diameter. The holdout support 400 is assembled as described above from the insert members 410, 450. The holdout support 400 is then inserted into the passage 102D of the holdout 102 as shown in FIG. 16. The angular alignment feature 424 is inserted into the passage 156 of the duct 151. In some embodiments, the holdout support 400 is inserted in the passage 102D while in the expanded configuration (FIG. 16). Alternatively, the holdout support 400 is inserted in the passage 102D while in the released configuration (FIG. 17), and then the insert member 450 is displaced or pushed forward relative to the insert member 410 to place the holdout support 400 in the expanded configuration. The ramped surfaces 436A, 466A ease the transition. The sleeve support assembly 403 is thereby constructed. The angular alignment feature 424 can serve to positively locate and angularly orient the insert member 410 with respect to the duct 151 and the cover member 100.

In some embodiments, the width W15 of the insert member 410 when the holdout support 400 is in the expanded position is chosen such that the holdout support 400 can be slid into the passage with little resistance. According to some embodiments, the lateral width W15 is substantially the same as the relaxed inner diameter of the holdout 102 before the elastically expanded inner sleeve 130 is mounted on the holdout 102. In some embodiments, the lateral width W15 is in the range of from about 0 to 5 mm less than the relaxed inner diameter of the holdout 102.

The inner sleeve 130 and remaining components of the cover assembly 100 are thereafter mounted on the holdout 102 (i.e., on the sleeve support assembly 403). In particular, the inner sleeve 130 is mounted on the holdout 102 in an elastically expanded state. The inner diameter of the inner sleeve 130 in a relaxed state is less than the outer diameter of the holdout 102 and, as a result, the holdout maintains the inner sleeve 130 in an elastically radially expanded state. The outer sleeve 140 may also be maintained in an elastically radially expanded state.

The holdout support 400 can provide resistance to warpage or deformation of the holdout device 102 as described above at different stages during the life of the pre-expanded unit 14. The holdout support 400 can provide resistance to warpage or deformation of the holdout device 102 during assembly of the pre-expanded unit 14 (i.e., as the cover assembly 100 is being mounted on the holdout device 102), during storage of the pre-expanded unit 14, and during transport of the pre-expanded unit 14.

The pre-expanded unit 14 can be used in the same manner as the pre-expanded unit 12 to install the cover assembly 100 on a substrate, except in the manner that the holdout support 400 is removed from the holdout device 102. In use, the handle 460 is pulled toward the handle 420, thereby transitioning the holdout support 400 from the expanded configuration (FIG. 16) to the released position (FIG. 17). The handle 460 may be conveniently pulled by grabbing around both handles 420, 460 and squeezing the handle 420 toward the handle 460. The legs 432 are thereby permit to deflect radially inwardly, reducing the load between the lateral edges 416 and the inner surface of the holdout device 102. The holdout support 400 in the released configuration is then withdrawn from the passage 102D. The remainder of the pre-expanded unit 14 is thereafter deployed in the same manner as described above for the pre-expanded unit 12.

With reference to FIGS. 18-22, a holdout support 500 according to further embodiments of the present invention is shown therein. The holdout support 500 is used in place of and in the same manner as the holdout support 400 in the pre-expanded unit 14. The holdout support 500 is assembled from a holdout support system 501, as discussed below. As described above with regard to the pre-expanded cover assembly unit 14, the holdout device 102 maintains the cover assembly 100 in an expanded state or position, and the holdout support 500 in turn supports the holdout device 102 to resist undesired deformation of the holdout device 102 under the load of the cover assembly 100. In particular, the holdout support 500 prevents, limits or resists radial deformation of the holdout device 102.

The holdout support 500 includes a first or outer insert member 510 and a second or inner insert member 550.

The outer insert member 510 has opposed ends 512A, 512B. The outer insert member 510 has a lengthwise axis K-K and a lateral axis J-J perpendicular to the lengthwise axis K-K. The axis K-K is parallel to the holdout central axis E-E when the holdout support 500 is mounted in the holdout 102. The outer insert member 510 has an outer portion 514A extending from the outer end 512A and an inner portion 514B extending from the inner end 512B. Opposed lateral edges 516 extend lengthwise substantially parallel to the axis K-K, from proximate end 512A to end 512B.

The outer portion 514A includes a handle 520 and a recess or opening 522. The outer portion 514A also includes a duct locator or angular alignment feature 524 in the form of an elongate post.

The inner portion 514B includes opposed longitudinally extending legs 532, which include the opposed lateral edges 516. Each leg 532 is cantilevered and extends from a base end secured to the outer portion 514A proximate the handle 520 to a free end at the inner end 512B. A longitudinally extending receiver slot 530 is defined by and between the legs 532.

Each leg 532 includes a series of integral, longitudinally spaced apart, laterally inwardly extending actuator features 536. Each actuator feature 536 includes a ramped surface 536A.

The inner insert member 550 has opposed ends 552A, 552B. The insert member 550 has a lengthwise axis M-M and a lateral axis N-N perpendicular to the lengthwise axis M-M. The axis M-M extends parallel to the axis K-K. The insert member 550 has an outer portion 554A extending from the outer end 552A and an inner portion 554B extending from the inner end 552B. Opposed lateral edges 564 extend lengthwise substantially parallel to the axis M-M, from end 512A to end 512B.

The outer portion 514A is provided with a handle 560.

The inner portion 514B includes laterally extending crossbars 568 defining openings or voids 566 therebetween. Each crossbar 568 includes an actuator feature 570. Each actuator feature 570 includes a ramped surface 570A and a land 570B.

Figure 21:
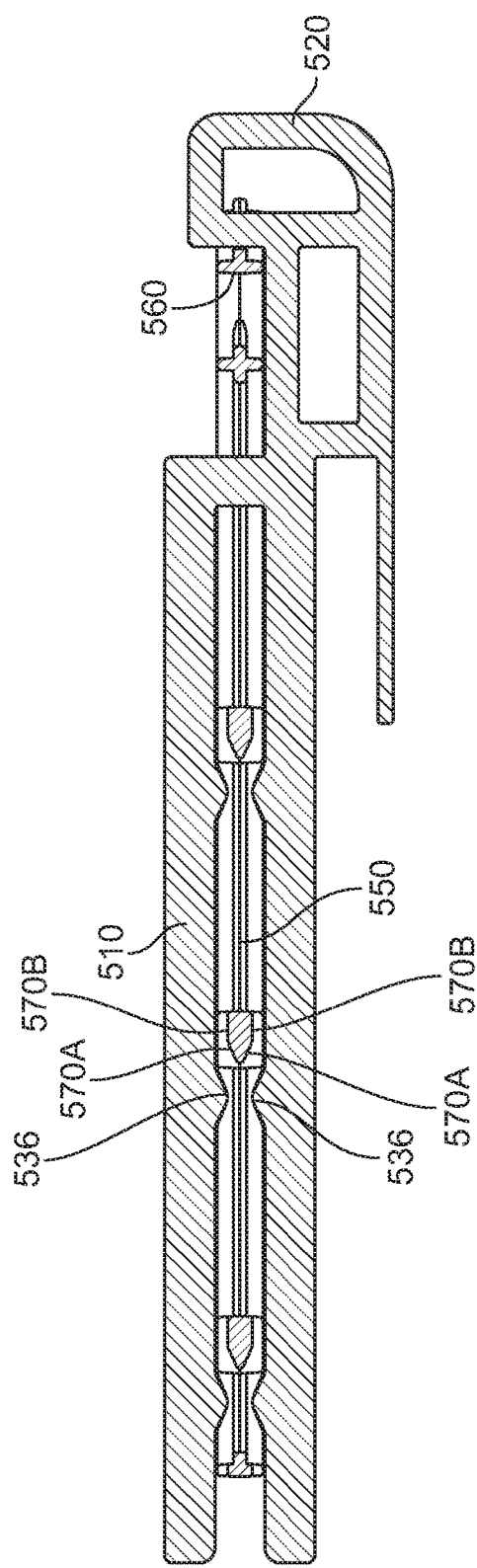
FIG. 21 is a cross-sectional view of the holdout support of FIG. 18 wherein the holdout support is in a released configuration.
Figure 22:
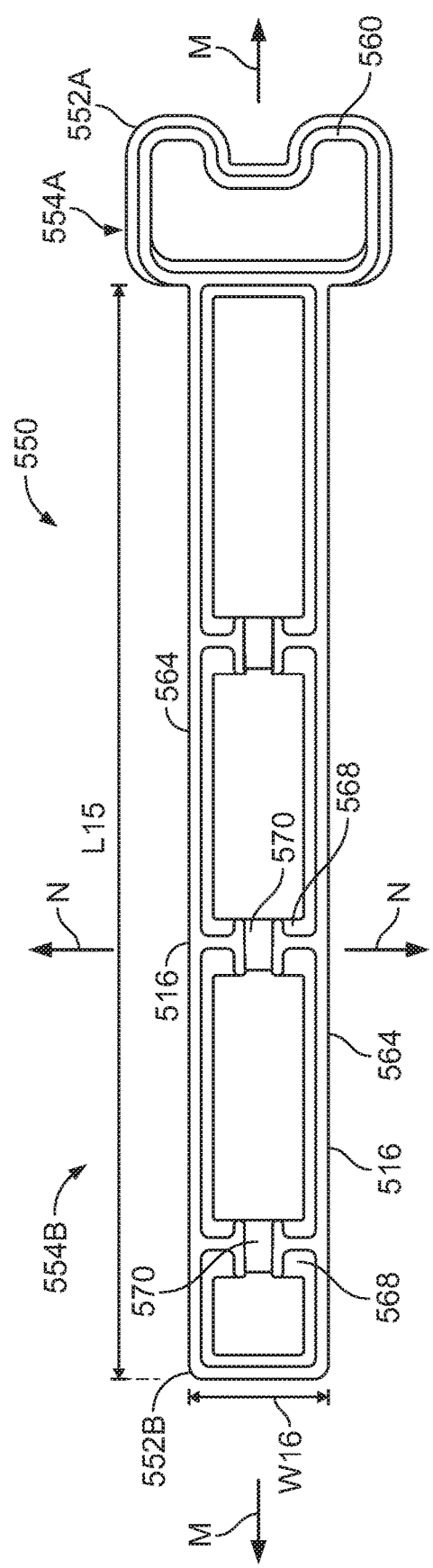
FIG. 22 is a top view of an inner insert member forming a part of the holdout support of FIG. 18.

The insert members 510, 550 are assembled into the holdout support 500 by relatively orienting the insert members 510, 550 at a 90 degree angular offset and inserting the inner member 550 into the receiver slot 530 of the outer insert member 550 as shown in FIG. 21. Thus positioned, the holdout support 500 is placed in a released configuration. In the released configuration, the legs 532 can be displaced radially inwardly to a width narrower than the expanded width W17 (FIG. 20). The inner insert member 550 is then pushed axially forward relative to the outer insert member 510 until the actuator features 536 abut the lands 570B, thereby transitioning the holdout support 500 into an expanded configuration as shown in FIGS. 18-20. In the expanded configuration, the width of the legs 532 is limited to no less than the width W17.

The insert members 510, 550 are thereby secured in a criss-cross configuration with their respective lengthwise axes K-K, M-M substantially parallel and their respective lateral axes J-J, N-N substantially perpendicular. In this way, the insert members 510, 550 form a generally "t" or "+" profile, shape or configuration in lateral cross-section (FIG. 18).

According to some embodiments, the length L15 (FIG. 20) of the each leg 532 is in the range of from about 6 to 35 inches. According to some embodiments, the length L15 is greater than the length of the holdout 102. According to some embodiments, the length L15 is in the range of from about 1 inch greater or less than the length of the holdout 102.

The insert members 510, 550 can be formed of a material or materials as discussed above for the insert members 210, 240. The insert members 510, 550 can be formed using a technique or techniques as described above for the insert members 210, 240. According to some embodiments, each insert member 510, 550 is a unitary, monolithic structure.

According to some embodiments, the thickness of each insert member 510, 550 is in the range of from about 2 to 20 mm.

A pre-expanded unit can be assembled or manufactured using the holdout support 500 in the same manner as described for the holdout support 400 and the pre-expanded unit 14. The holdout 102 is provided having an initial or relaxed inner diameter. The holdout support 500 is assembled as described above from the insert members 510, 550. The holdout support 500 is then inserted into the passage 102D of the holdout 102. The angular alignment feature 524 is inserted into the passage 156 of the duct 151. In some embodiments, the holdout support 500 is inserted in the passage 102D while in the expanded configuration. Alternatively, the holdout support 500 is inserted in the passage 102D while in the released configuration, and then the insert member 550 is displaced or pushed forward relative to the insert member 510 to place the holdout support 500 in the expanded configuration. The ramped surfaces 536A, 570A ease the transition. A sleeve support assembly is thereby constructed. The angular alignment feature 524 can serve to positively locate and angularly orient the insert member 510 with respect to the duct 151 and the cover member 100.

In some embodiments, the widths W17 (FIG. 20), W16 (FIG. 22) of the insert members 510, 550 when the holdout support 400 is in the expanded position are chosen such that the holdout support 500 can be slid into the passage with little resistance. According to some embodiments, the lateral widths W17, W16 are substantially the same as the relaxed inner diameter of the holdout 102 before the elastically expanded inner sleeve 130 is mounted on the holdout 102. In some embodiments, the lateral widths W17, W16 are in the range of from about 0 to 3 mm less than the relaxed inner diameter of the holdout 102.

The inner sleeve 130 and remaining components of the cover assembly 100 are thereafter mounted on the holdout 102. In particular, the inner sleeve 130 is mounted on the holdout 102 in an elastically expanded state. The inner diameter of the inner sleeve 130 in a relaxed state is less than the outer diameter of the holdout 102 and, as a result, the holdout maintains the inner sleeve 130 in an elastically radially expanded state. The outer sleeve 140 may also be maintained in an elastically radially expanded state.

The holdout support 500 can provide resistance to warpage or deformation of the holdout device 102 as described above at different stages during the life of the pre-expanded unit. The holdout support 500 can provide resistance to warpage or deformation of the holdout device 102 during assembly of the pre-expanded unit (i.e., as the cover assembly 100 is being mounted on the holdout device 102), during storage of the pre-expanded unit, and during transport of the pre-expanded unit.

The pre-expanded unit can be used in the same manner as the pre-expanded unit 14 to install the cover assembly 100 on a substrate, except that the holdout support 500 engages the inner diameter of the holdout device 102 along both the lateral edges 516 and the lateral edges 564, and reinforces the holdout device 102 along both of the axes J-J, N-N. In use, the handle 560 is forcibly pulled toward the handle 520, thereby transitioning the holdout support 500 from the expanded configuration to the released position. The handle 560 may be conveniently pulled by grabbing around both handles 520, 560 and squeezing the handle 520 toward the handle 560 in the direction DH (FIG. 20). The insert member 510 is thereby axially displaced relative to the insert member 550. The actuator features 570 are thereby withdrawn from laterally between the actuator features 536. The legs 532 are thereby permitted to deflect radially inwardly, reducing the load between the lateral edges 516 and the inner surface of the holdout device 102. The holdout support 500 in the released configuration is then withdrawn from the passage 102D. The remainder of the pre-expanded unit is thereafter deployed in the same manner as described above for the pre-expanded unit 12.

Figure 23:
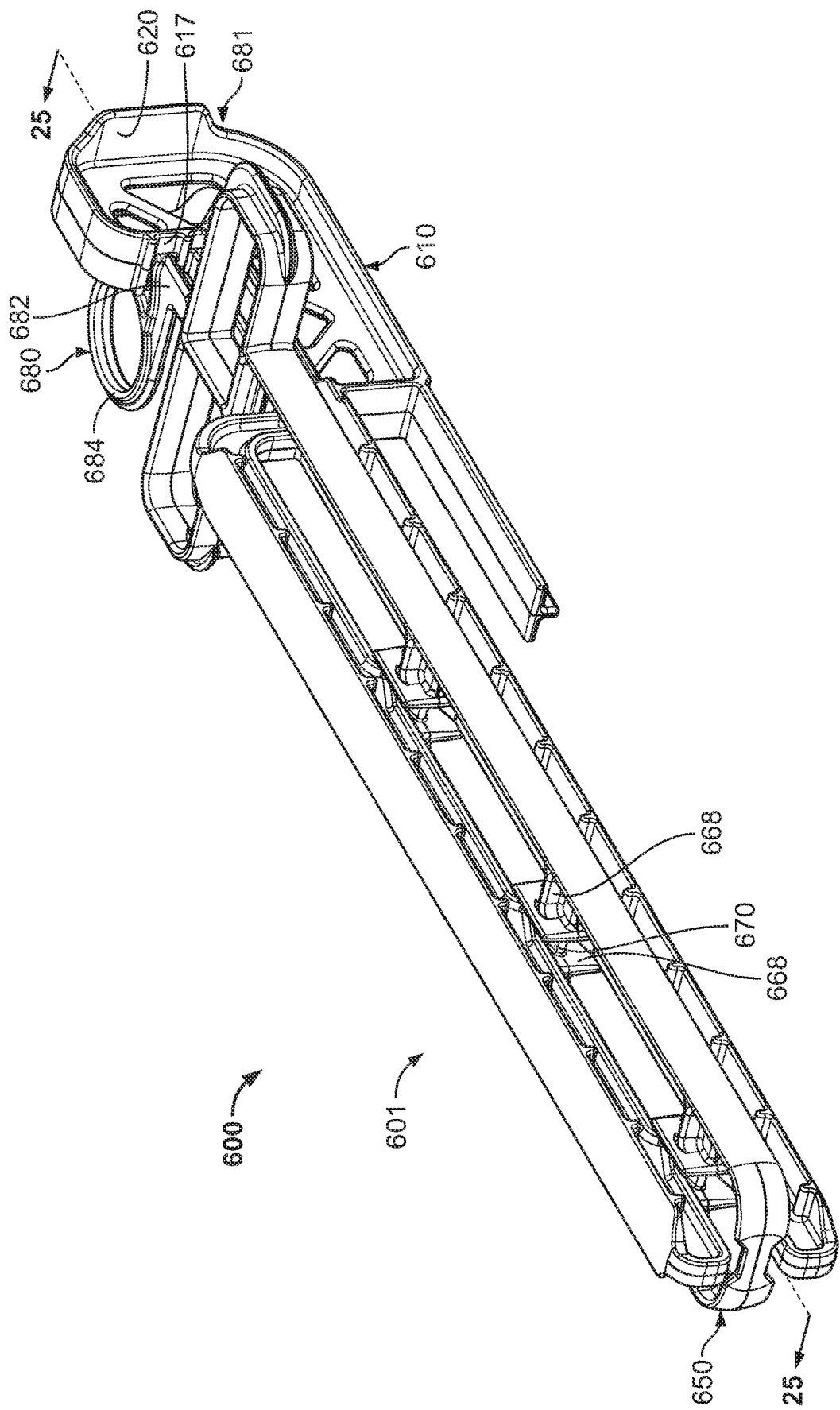
FIG. 23 is a perspective view of a holdout support according to further embodiments of the invention.
Figure 24:
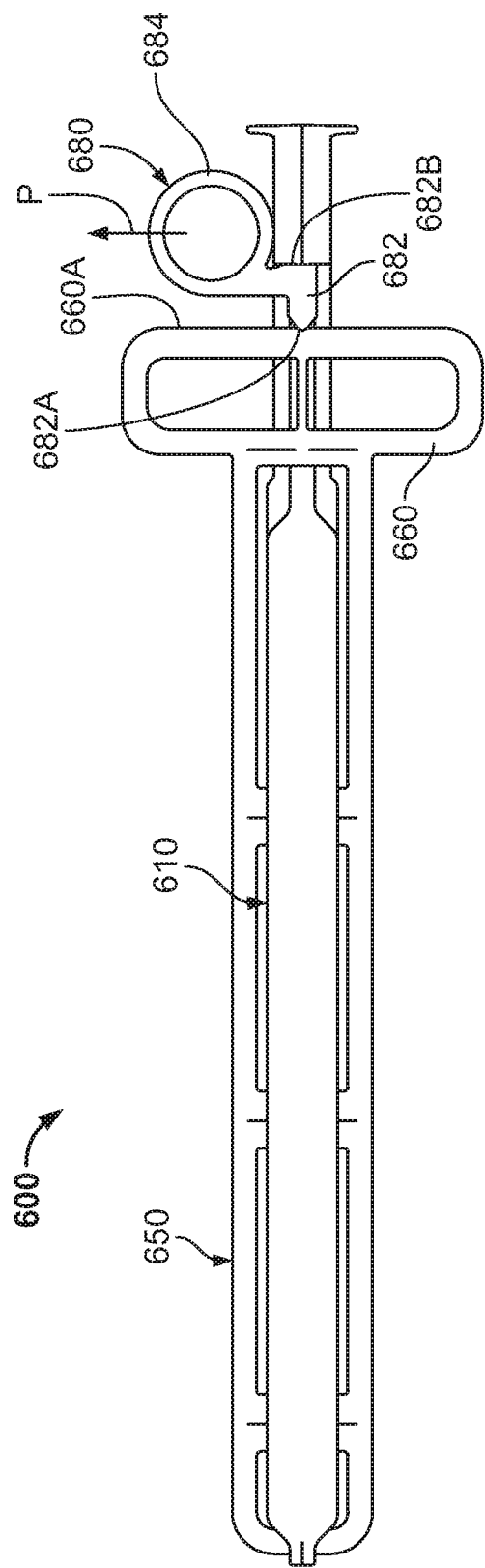
FIG. 24 is a top view of the holdout support of FIG. 23.

With reference to FIGS. 23-25, a holdout support 600 according to further embodiments of the present invention is shown therein. The holdout support 600 can be used in place of and in the same manner as the holdout support 400 in the pre-expanded unit 14. The holdout support 600 is assembled from a holdout support system 601, as discussed below. As described above with regard to the pre-expanded cover assembly unit 14, the holdout device 102 maintains the cover assembly 100 is in an expanded state or position, and the holdout support 600 in turn supports the holdout device 102 to resist undesired deformation of the holdout device 102 under the load of the cover assembly 100. In particular, the holdout support 600 prevents, limits or resists radial deformation of the holdout device 102.

The holdout support 600 includes a first or outer insert member 610, a second or inner insert member 650, a lock member 680, and a lock mechanism 681. The outer insert member 610 and the inner insert member 650 are constructed and operate in the same manner as the outer insert member 510 and the inner insert member 550, respectively, except as discussed below.

The outer insert member 610 includes a retention slot 617 defined in the inner side 620A of the handle 620. The retention slot 617 cooperates with the lock member 680 to form the locking mechanism 681.

The lock member 680 includes a wedge portion 682 and an integral handle 684. The wedge portion 682 has an inner end 682A and an opposing outer end 682B. The inner end 682A engages the outer end 660A of the handle 660 of the inner insert member 650. In some embodiments, the inner end 682A is integral with the handle 660. In some embodiments, the inner end 682A is unitarily molded with the handle 660.

In use, the lock member 680 is initially provided in the locking position as show in FIGS. 23-25. In the locking position, the wedge portion 682 is interposed or wedged between the inner face 620A of the handle 620 and the outer face 660A of the handle 660. The outer end 682B of the lock member 680 is seated in the retention slot 617. In the locking position, the lock member 680 prevents the handles 620 and 660 from being pulled together a distance sufficient to transition the holdout support 600 from the expanded configuration to the released position.

When it is desired to remove the holdout support 600 from the holdout 102, the wedge portion 682 is removed from between the handles 620, 660 by grabbing and pulling the lock member handle 684 laterally (in direction P; FIG. 24). With the wedge portion 682 removed, the handle 660 may be conveniently pulled by grabbing around both handles 620, 660 and squeezing the handle 620 toward the handle 660 in the direction DH (FIG. 25) as described above for the holdout support 500.

The holdout support 600 also differs from the holdout support 500 in that each crossbar 668 includes an actuator feature 670 that includes ramped surfaces 670A without lands corresponding to lands 570B. Thus, the ramped surfaces 636A of the actuator feature 636 abut the ramped surfaces 670A when the holdout support 600 is in the expanded configuration. As a result, the inner member 610 is easier for an installer to slide relative to the outer member 650 to transition the holdout support 600 from the expanded configuration to the released position. However, in the absence of the lock member 680, the ease of transition may risk inadvertent actuation of the holdout support 600. The locking mechanism 681 thus serves to prevent undesired and inadvertent release of the holdout support 600.

With reference to FIGS. 26-29, a holdout support 700 according to further embodiments of the present invention is shown therein. The holdout support 700 can be used in place of and in the same manner as the holdout support 400 and the holdout support 600 in the pre-expanded unit 14. The holdout support 700 is assembled from a holdout support system 701, as discussed below. As described above with regard to the pre-expanded cover assembly unit 14, the holdout device 102 maintains the cover assembly 100 is in an expanded state or position, and the holdout support 700 in turn supports the holdout device 102 to resist undesired deformation of the holdout device 102 under the load of the cover assembly 100. In particular, the holdout support 700 prevents, limits or resists radial deformation of the holdout device 102.

The holdout support 700 includes a first or outer insert member 710, a second or inner insert member 750, a lock member 780, and a lock mechanism 781. The outer insert member 710 and the inner insert member 750 are constructed and operate in the same manner as the outer insert member 510 and the inner insert member 550, respectively, except as discussed below.

The inner insert member 750 includes an integral retention flange 757 projecting from the outer side 760A of the handle 760. The retention flange 757 cooperates with the lock member 780 to form the locking mechanism 781.

The lock member 780 includes a wedge body 782, a retention slot 784, opposed side tabs 786A, and a top tab 786B. The tabs 786A-B define a retention socket 786D.

Figure 26:
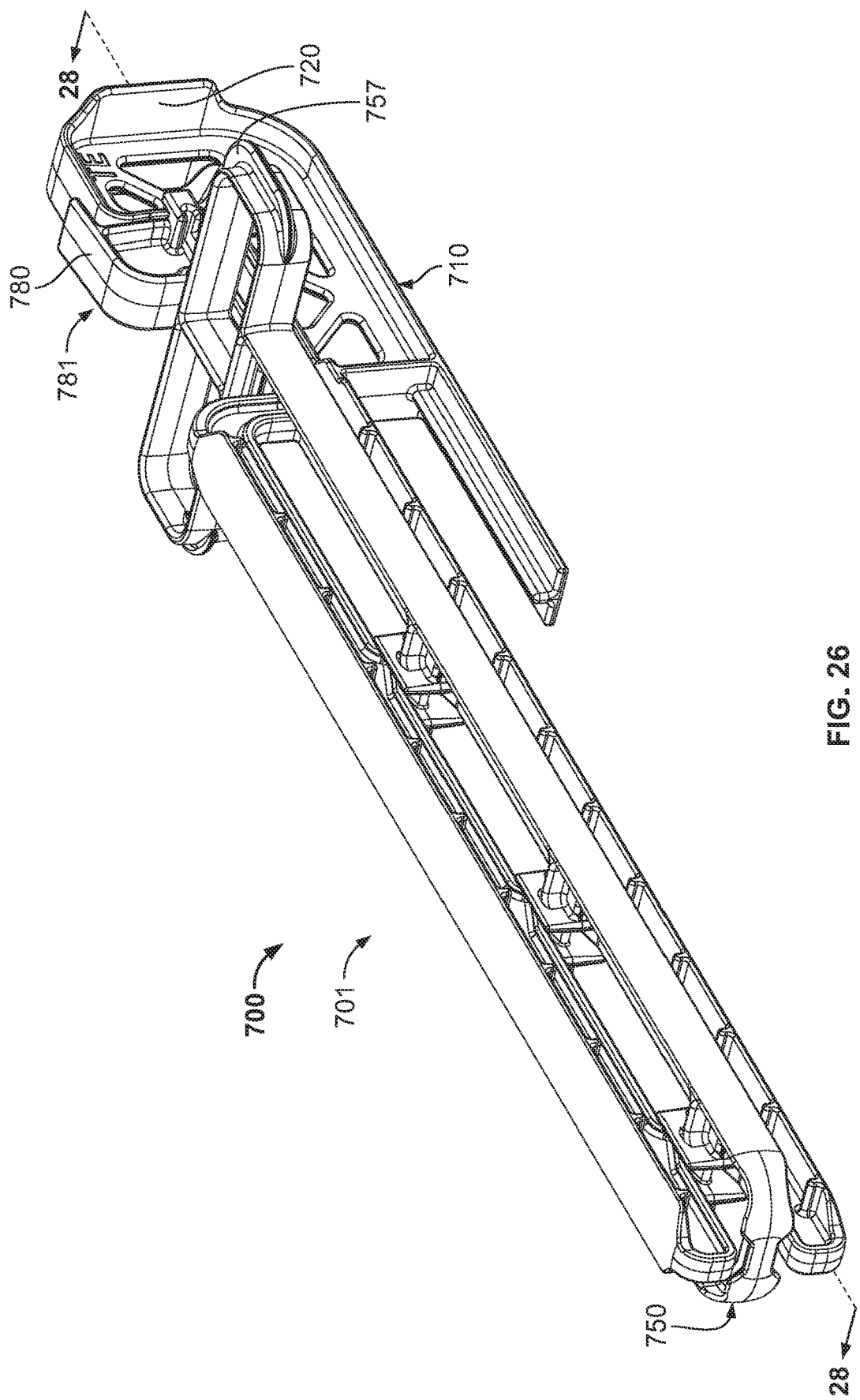
FIG. 26 is a perspective view of a holdout support according to further embodiments of the invention.
Figure 27:
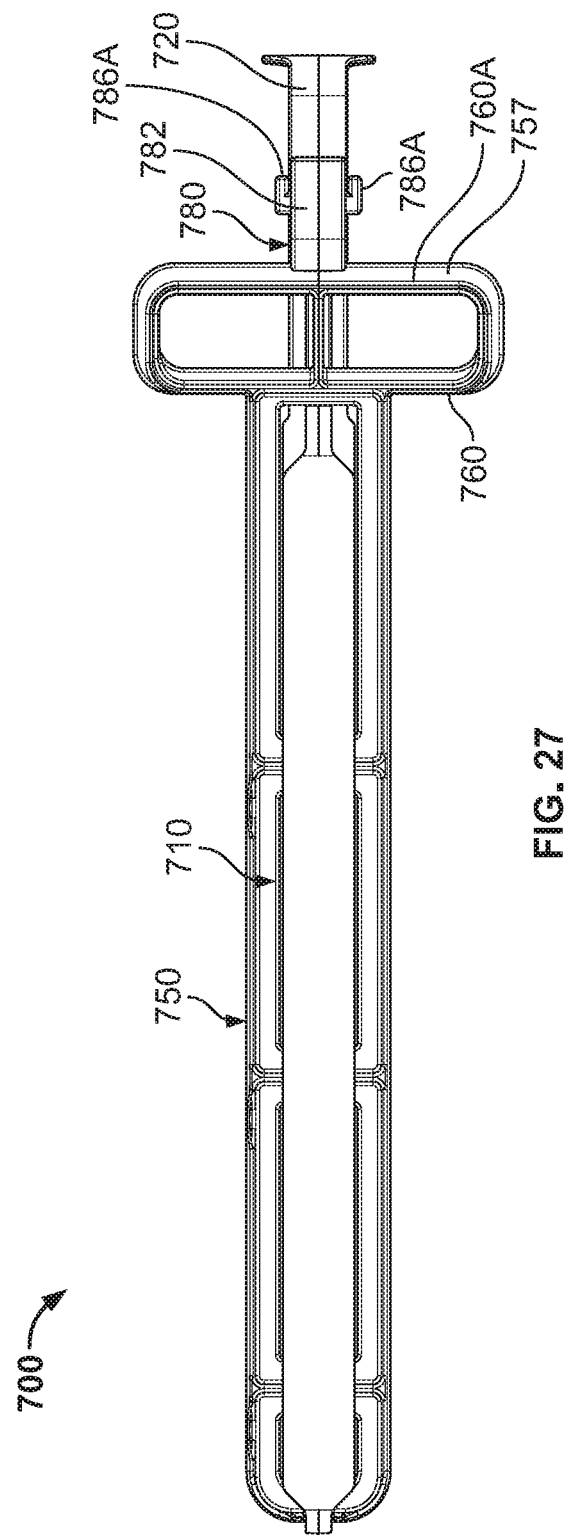
FIG. 27 is a top view of the holdout support of FIG. 26.
Figure 28:
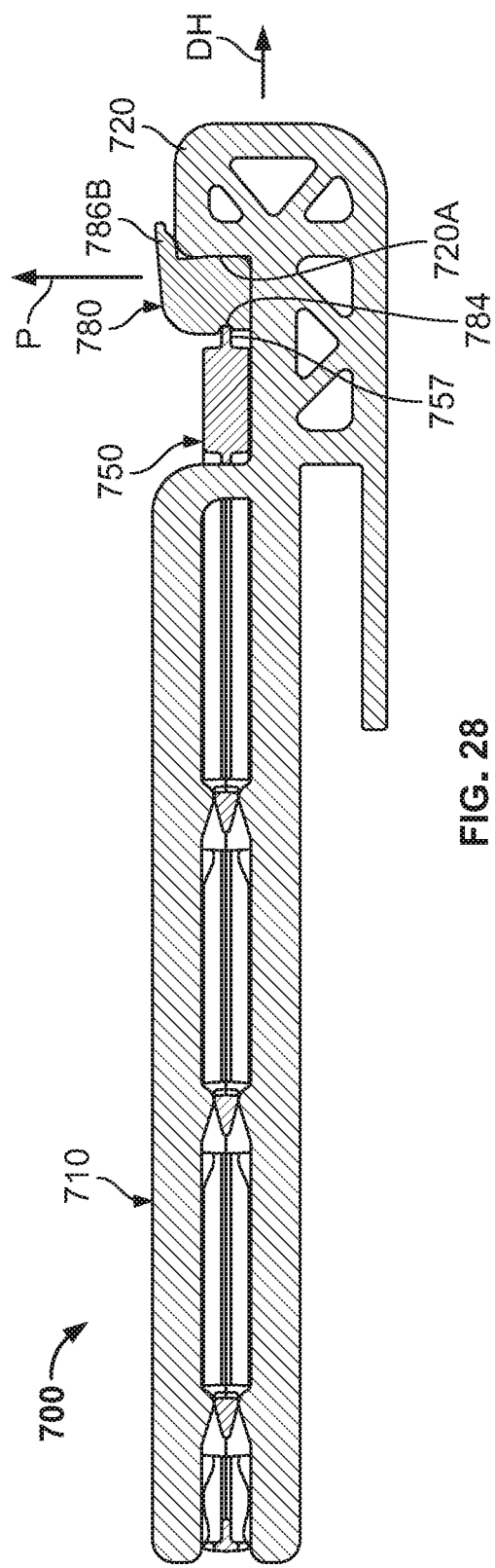
FIG. 28 is a cross-sectional view of the holdout support of FIG. 26 taken along the line 28-28 of FIG. 26, wherein the holdout support is in a locked and expanded configuration.
Figure 29:
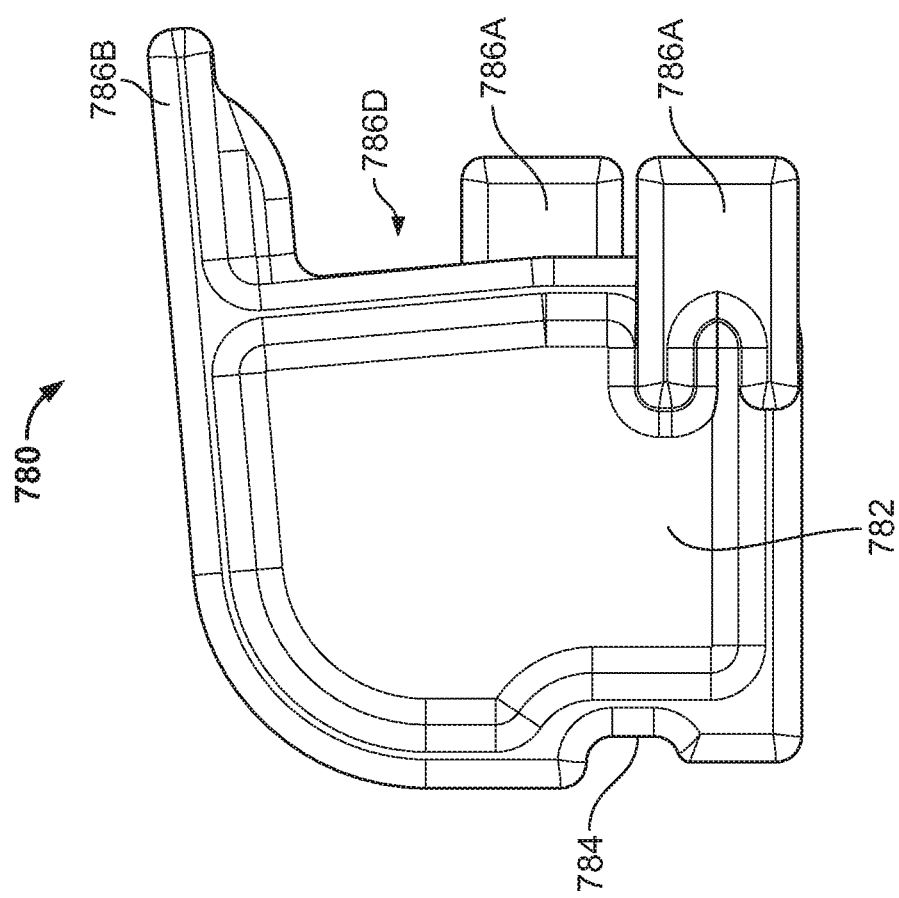
FIG. 29 is a side view of a lock member forming a part of the holdout support of FIG. 26.

In use, the lock member 780 is initially provided in the locking position as show in FIGS. 26-28. In the locking position, the wedge body 782 is interposed or wedged between the inner face 760A of the handle 760 and the outer face 720A of the handle 720. The inner end of the insert member 710 is seated in the retention socket 786D. The retention flange 757 is seated in the retention slot 784. In the locking position, the lock member 780 prevents the handles 720, 760 from being pulled together a distance sufficient to transition the holdout support 700 from the expanded configuration to the released position.

When it is desired to remove the holdout support 700 from the holdout 102, the lock member 780 is removed from between the handles 720, 760 by grabbing and pulling the lock member 780 up and out (in direction P; FIG. 28). With the lock member 780 removed, the handle 760 may be conveniently pulled by grabbing around both handles 720, 760 and squeezing the handle 720 toward the handle 760 in the direction DH (FIG. 28) as described above for the holdout support 500.

It will be appreciated that the lock member 780 and lock mechanism 781 can provide benefits similar to those of the lock member 680 and the lock mechanism 681.

In some embodiments, a holdout support as disclosed herein is used to support a holdout while other components (e.g., the sleeves 130, 140) are being mounted on the holdout during manufacture. The holdout support is then removed from the holdout prior to storage or delivery of the holdout and other components to the end user.

According to some embodiments, the lateral edges 216, 416, 516, 564 are smooth and the holdout support is installed such that no debris is present on the lateral edges. In this way, the holdout support does not introduce scratches on the internal surface of the holdout 102, such scratches could in turn affect the surface finish on the internal surface of the inner sleeve 130.

Holdout supports and sleeve support assemblies according to embodiments of the invention can be used with covers and cover assemblies of other types and configurations. The cover assemblies may include additional layers and/or certain layers may be omitted. For example, the cover assemblies may be formed without the semiconductor layer 139. One or more additional layers may be interposed between the inner sleeve 130 and the outer sleeve 140. The cover assembly may use a duct of a different design (e.g., a nonflexible duct) and/or may include multiple ducts. The pre-expanded unit may include a cover or cover assembly without a duct. The cover on the pre-expanded unit may consist of only a single elastomeric sleeve (e.g., an elastomeric joint body sleeve that is mounted independently of or without the other components, or an elastomeric re-jacket sleeve that is mounted independently of or without the other components).

While in the embodiments shown in the drawings the neutral conductors are wires, according to further embodiments the neutral conductors may take other shapes or configurations such as one or more flat tapes. In some embodiments, an elongate jumper or extension conductor is provided that is clamped or otherwise secured in electrical contact with the cable neutral conductors (e.g., flat copper tapes) on either side of the splice and is routed through the duct (e.g., the duct 151) as described herein. In this case, the jumper conductor constitutes a neutral conductor and is an extension of the neutral conductor of at least one of the spliced cables. The jumper conductor may be a braided copper mesh or sock, for example.

Pre-expanded units and holdout supports according to embodiments of the invention may be used for any suitable cables and connections. Such cable assemblies may be adapted for use, for example, with connections of medium voltage cables up to about 46 kV. In some applications, the cover assemblies or ducts are installed on underground residential distribution (URD) cable splices.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An integral, unitary pre-expanded cover assembly unit for covering an elongate substrate, the pre-expanded cover assembly unit comprising:
    an elastomeric sleeve defining a sleeve passage to receive the elongate substrate;
    a holdout removably mounted within the sleeve passage of the elastomeric sleeve, the holdout defining a holdout passage, wherein the holdout maintains the elastomeric sleeve in an expanded state; and
    a holdout support removably mounted within the holdout passage, wherein the holdout support reinforces the holdout;
    wherein the holdout support is configured to be selectively transitioned from an expanded configuration in the holdout passage to a released configuration to facilitate removal of the holdout support from the holdout passage.

2. The pre-expanded cover assembly unit of claim 1 wherein:
    the holdout support includes a first insert member and a second insert member; and
    the holdout support is configured to transition from the expanded configuration to the released configuration by displacing the second insert member relative to the first insert member.

3. The pre-expanded cover assembly unit of claim 1 wherein the holdout includes a tubular holdout body formed from a helically wound strip, and the holdout is removable from the elastomeric sleeve by pulling the strip.

4. The pre-expanded cover assembly unit of claim 1 wherein:
    the elastomeric sleeve is a first elastomeric sleeve;
    the cover assembly includes a second elastomeric sleeve surrounding the first elastomeric sleeve; and
    the holdout maintains the second elastomeric sleeve in an expanded state.

5. The pre-expanded cover assembly unit of claim 4 wherein:
    the second elastomeric sleeve is formed of ethylene propylene diene monomer (EPDM) rubber;
    the first elastomeric sleeve is formed of silicone rubber;
    the cover assembly includes a Faraday cage sleeve mounted within the first elastomeric sleeve and formed of an electrically conductive elastomer;
    the cover assembly includes a stress cone sleeve mounted within the first elastomeric sleeve proximate an end thereof, wherein the stress cone sleeve is formed of an electrically conductive elastomer; and
    the cover assembly includes a semiconductor layer mounted on an outer side of the first elastomeric sleeve.

6. The pre-expanded cover assembly unit of claim 1 wherein the cover assembly is a cold shrinkable cover assembly.

7. The pre-expanded cover assembly unit of claim 2 wherein:
    the first insert member engages the holdout along a first radial axis;
    the second insert member engages the holdout along a second radial axis; and
    the first and second radial axes are substantially perpendicular.

8. The pre-expanded cover assembly unit of claim 2 wherein the holdout support is configured to transition from the expanded configuration to the released configuration by relatively axially displacing the second insert member relative to the first insert member.

9. The pre-expanded cover assembly unit of claim 8 wherein:
    the first insert member includes an integral first handle;
    the second insert member includes an integral second handle; and
    the holdout support is configured to transition from the expanded configuration to the released configuration by squeezing the first and second handles toward one another.

10. The pre-expanded cover assembly unit of claim 8 wherein:
    the first insert member includes a pair of opposed legs and an integral first actuator feature;
    the second insert member includes an integral second actuator feature engaging the first actuator feature to hold the opposed legs in a radially expanded position;
    at least one of the first and second actuator features is ramped; and
    relatively axially displacing the second insert member relative to the first insert member displaces the second actuator feature relative to the first actuator feature to permit the opposed legs to move toward one another.

11. The pre-expanded cover assembly unit of claim 8 including a lock member that prevents relative axial displacement between the second insert member and the first insert member to transition from the expanded configuration to the released configuration, and is selectively removable to permit relative axial displacement between the second insert member and the first insert member to transition from the expanded configuration to the released configuration.

12. A sleeve support assembly for supporting an elastomeric sleeve defining a sleeve passage to receive an elongate substrate, the sleeve support assembly comprising:
    a holdout configured to be removably mounted within the sleeve passage of the elastomeric sleeve, the holdout defining a holdout passage, wherein the holdout maintains the elastomeric sleeve in an expanded state when mounted within the sleeve passage; and
    a holdout support removably mounted within the holdout passage, wherein the holdout support reinforces the holdout;
    wherein the holdout support is configured to be selectively transitioned from an expanded configuration in the holdout passage to a released configuration to facilitate removal of the holdout support from the holdout passage.

13. A method for installing an elastomeric sleeve defining a sleeve passage on an elongate substrate, the method comprising:
    providing a pre-expanded unit including:
        an elastomeric sleeve defining a sleeve passage to receive the elongate substrate;
        a holdout removably mounted within the sleeve passage of the elastomeric sleeve, the holdout defining a holdout passage, wherein the holdout maintains the elastomeric sleeve in an expanded state; and
        a holdout support removably mounted within the holdout passage, wherein the holdout support reinforces the holdout;
        wherein the holdout support is configured to be selectively transitioned from an expanded configuration in the holdout passage to a released configuration to facilitate removal of the holdout support from the holdout passage;

transitioning the holdout support from the expanded configuration to the released configuration;
removing the holdout support from the holdout passage;
mounting the elastomeric sleeve and the holdout on the elongate substrate such that the elongate substrate extends through the sleeve passage and the holdout passage; and
removing the holdout from the elastomeric sleeve.

14. An integral, unitary pre-expanded cover assembly unit for covering an elongate substrate, the pre-expanded cover assembly unit comprising:
an elastomeric sleeve defining a sleeve passage to receive the elongate substrate;
a holdout removably mounted within the elastomeric sleeve, the holdout defining a holdout passage, wherein the holdout maintains the elastomeric sleeve in an expanded state; and
a holdout support removably mounted within the holdout passage, wherein the holdout support reinforces the holdout;
wherein:
the holdout support includes a first insert member and a second insert member; and
the first insert member and the second insert member are independently removable from the holdout passage to facilitate removal of the holdout support from the holdout passage.

15. The pre-expanded cover assembly unit of claim 14 wherein:
the first insert member engages the holdout along a first radial axis;
the second insert member engages the holdout along a second radial axis; and
the first and second radial axes are substantially perpendicular.

16. The pre-expanded cover assembly unit of claim 14 wherein the holdout includes a tubular holdout body formed from a helically wound strip, and the holdout is removable from the elastomeric sleeve by pulling the strip.

17. The pre-expanded cover assembly unit of claim 14 wherein:
the elastomeric sleeve is a first elastomeric sleeve;
the cover assembly includes a second elastomeric sleeve surrounding the first elastomeric sleeve; and
the holdout maintains the second elastomeric sleeve in an expanded state.

18. The pre-expanded cover assembly unit of claim 17 wherein:
the second elastomeric sleeve is formed of ethylene propylene diene monomer (EPDM) rubber;
the first elastomeric sleeve is formed of silicone rubber;
the cover assembly includes a Faraday cage sleeve mounted within the first elastomeric sleeve and formed of an electrically conductive elastomer;
the cover assembly includes a stress cone sleeve mounted within the first elastomeric sleeve proximate an end thereof, wherein the stress cone sleeve is formed of an electrically conductive elastomer; and
the cover assembly includes a semiconductor layer mounted on an outer side of the first elastomeric sleeve.

19. A sleeve support assembly for supporting an elastomeric sleeve defining a sleeve passage to receive an elongate substrate, the sleeve support assembly comprising:
a holdout configured to be removably mounted within the sleeve passage of the elastomeric sleeve, the holdout defining a holdout passage, wherein the holdout maintains the elastomeric sleeve in an expanded state when mounted within the sleeve passage; and
a holdout support removably mounted within the holdout passage, wherein the holdout support reinforces the holdout;
wherein:
the holdout support includes a first insert member and a second insert member; and
the first insert member and the second insert member are independently removable from the holdout passage to facilitate removal of the holdout support from the holdout passage.

20. A method for installing an elastomeric sleeve defining a sleeve passage on an elongate substrate, the method comprising:
providing a pre-expanded unit including:
an elastomeric sleeve defining a sleeve passage to receive the elongate substrate;
a holdout removably mounted within the sleeve passage of the elastomeric sleeve, the holdout defining a holdout passage, wherein the holdout maintains the elastomeric sleeve in an expanded state; and
a holdout support removably mounted within the holdout passage, wherein the holdout support reinforces the holdout;
wherein:
the holdout support includes a first insert member and a second insert member; and
the first insert member and the second insert member are independently removable from the holdout passage to facilitate removal of the holdout support from the holdout passage;
removing the holdout support from the holdout passage, including independently removing the first insert member and the second insert member from the holdout passage;
mounting the elastomeric sleeve and the holdout on the elongate substrate such that the elongate substrate extends through the sleeve passage and the holdout passage; and
removing the holdout from the elastomeric sleeve.

* * * * *